(12) United States Patent
Goldenberg et al.

(10) Patent No.: US 8,515,926 B2
(45) Date of Patent: Aug. 20, 2013

(54) PROCESSING RELATED DATA FROM INFORMATION SOURCES

(75) Inventors: Glenn Goldenberg, Austin, TX (US); Ruwei Hu, Austin, TX (US); Jason Woods, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/726,696

(22) Filed: Mar. 22, 2007

(65) Prior Publication Data
US 2011/0010346 A1 Jan. 13, 2011

(51) Int. Cl.
*G06F 17/30* (2006.01)

(52) U.S. Cl.
USPC ............................. 707/696; 707/758; 705/2

(58) Field of Classification Search
USPC .............................. 707/1, 3, 696, 758; 705/2
See application file for complete search history.

(56) References Cited

U.S. PATENT DOCUMENTS

| | | | |
|---|---|---|---|
| 4,531,186 A | 7/1985 | Knapman |
| 5,020,019 A | 5/1991 | Ogawa |
| 5,134,564 A | 7/1992 | Dunn et al. |
| 5,247,437 A | 9/1993 | Vale et al. |
| 5,321,833 A | 6/1994 | Chang et al. |
| 5,323,311 A | 6/1994 | Fukao et al. |
| 5,333,317 A | 7/1994 | Dann |
| 5,381,332 A | 1/1995 | Wood |
| 5,442,782 A | 8/1995 | Malatesta et al. |
| 5,497,486 A | 3/1996 | Stolfo et al. |
| 5,535,322 A | 7/1996 | Hecht |
| 5,535,382 A | 7/1996 | Ogawa |
| 5,537,590 A | 7/1996 | Amado |
| 5,555,409 A | 9/1996 | Leenstra et al. |
| 5,561,794 A | 10/1996 | Fortier |
| 5,583,763 A | 12/1996 | Atcheson et al. |
| 5,600,835 A | 2/1997 | Garland et al. |
| 5,606,690 A | 2/1997 | Hunter et al. |
| 5,615,367 A | 3/1997 | Bennett et al. |

(Continued)

FOREIGN PATENT DOCUMENTS

| | | |
|---|---|---|
| JP | 2000346042 | 12/2000 |
| JP | 2001236358 | 8/2001 |

(Continued)

OTHER PUBLICATIONS

"A survey on Bioinformatics data and service Integration using ontology and declarative workflow query language" Emdad Ahmed, Department of Computer Science, Wayne State University, USA, Mar. 15, 2007.*

(Continued)

*Primary Examiner* — Cindy Nguyen
(74) *Attorney, Agent, or Firm* — Terry J. Carroll; Edell, Shapiro & Finnan, LLC

(57) ABSTRACT

Systems and methods for managing data are disclosed. Embodiments of the present invention may allow attribute values associated with data records to be assembled and presented in a unified manner. More particularly, embodiments of the present invention may utilize a set of locally stored identity information associated with a data record to determine a set of logical procedures operable to retrieve values for one or more non-identity attributes from a remote location. Furthermore, other embodiments of the present invention may apply a logical procedure to the values of the attributes corresponding to data records to select one or more values of one or more attributes of the data records.

36 Claims, 11 Drawing Sheets

(56) References Cited

U.S. PATENT DOCUMENTS

| | | | |
|---|---|---|---|
| 5,640,553 A | 6/1997 | Schultz | |
| 5,651,108 A | 7/1997 | Cain et al. | |
| 5,675,752 A | 10/1997 | Scott et al. | |
| 5,675,753 A | 10/1997 | Hansen et al. | |
| 5,694,593 A | 12/1997 | Baclawski | |
| 5,694,594 A | 12/1997 | Chang | |
| 5,710,916 A | 1/1998 | Barbara et al. | |
| 5,734,907 A | 3/1998 | Jarossay et al. | |
| 5,765,150 A | 6/1998 | Burrows | |
| 5,774,661 A | 6/1998 | Chatterjee | |
| 5,774,883 A | 6/1998 | Andersen | |
| 5,774,887 A | 6/1998 | Wolff et al. | |
| 5,778,370 A | 7/1998 | Emerson | |
| 5,787,431 A | 7/1998 | Shaughnessy | |
| 5,787,470 A | 7/1998 | DeSimone et al. | |
| 5,790,173 A | 8/1998 | Strauss | |
| 5,796,393 A | 8/1998 | MacNaughton et al. | |
| 5,805,702 A | 9/1998 | Curry | |
| 5,809,499 A | 9/1998 | Wong et al. | |
| 5,819,264 A | 10/1998 | Palmon et al. | |
| 5,835,712 A | 11/1998 | DuFresne | |
| 5,835,912 A | 11/1998 | Pet | |
| 5,848,271 A | 12/1998 | Caruso et al. | |
| 5,859,972 A | 1/1999 | Subramaniam et al. | |
| 5,862,322 A | 1/1999 | Anglin et al. | |
| 5,862,325 A | 1/1999 | Reed et al. | |
| 5,878,043 A | 3/1999 | Casey | |
| 5,893,074 A | 4/1999 | Hughes et al. | |
| 5,893,110 A | 4/1999 | Weber et al. | |
| 5,905,496 A | 5/1999 | Lau et al. | |
| 5,930,768 A | 7/1999 | Hooban | |
| 5,960,411 A | 9/1999 | Hartman et al. | |
| 5,963,915 A | 10/1999 | Kirsch | |
| 5,987,422 A | 11/1999 | Buzsaki | |
| 5,991,758 A * | 11/1999 | Ellard | 707/6 |
| 5,999,937 A | 12/1999 | Ellard | |
| 6,014,664 A | 1/2000 | Fagin et al. | |
| 6,016,489 A | 1/2000 | Cavanaugh et al. | |
| 6,018,733 A | 1/2000 | Kirsch et al. | |
| 6,018,742 A | 1/2000 | Herbert, III | |
| 6,026,433 A | 2/2000 | D'Arlach et al. | |
| 6,049,847 A | 4/2000 | Vogt et al. | |
| 6,067,549 A | 5/2000 | Smalley et al. | |
| 6,069,628 A | 5/2000 | Farry et al. | |
| 6,078,325 A | 6/2000 | Jolissaint et al. | |
| 6,108,004 A | 8/2000 | Medl | |
| 6,134,581 A | 10/2000 | Ismael et al. | |
| 6,185,608 B1 | 2/2001 | Hon et al. | |
| 6,223,145 B1 | 4/2001 | Hearst | |
| 6,269,373 B1 | 7/2001 | Apte et al. | |
| 6,297,824 B1 | 10/2001 | Hearst et al. | |
| 6,298,478 B1 | 10/2001 | Nally et al. | |
| 6,311,190 B1 | 10/2001 | Bayer et al. | |
| 6,327,611 B1 | 12/2001 | Everingham | |
| 6,330,569 B1 | 12/2001 | Baisley et al. | |
| 6,349,325 B1 | 2/2002 | Newcombe et al. | |
| 6,356,931 B2 | 3/2002 | Ismael et al. | |
| 6,374,241 B1 | 4/2002 | Lamburt et al. | |
| 6,385,600 B1 | 5/2002 | McGuinness et al. | |
| 6,389,429 B1 | 5/2002 | Kane et al. | |
| 6,446,188 B1 | 9/2002 | Henderson et al. | |
| 6,449,620 B1 | 9/2002 | Draper | |
| 6,457,065 B1 | 9/2002 | Rich et al. | |
| 6,460,045 B1 | 10/2002 | Aboulnaga et al. | |
| 6,496,793 B1 | 12/2002 | Veditz et al. | |
| 6,502,099 B1 | 12/2002 | Rampy et al. | |
| 6,510,505 B1 | 1/2003 | Burns et al. | |
| 6,523,019 B1 | 2/2003 | Borthwick | |
| 6,529,888 B1 | 3/2003 | Heckerman et al. | |
| 6,556,983 B1 | 4/2003 | Altschuler et al. | |
| 6,557,100 B1 | 4/2003 | Knutson | |
| 6,621,505 B1 | 9/2003 | Beauchamp et al. | |
| 6,633,878 B1 | 10/2003 | Underwood | |
| 6,633,882 B1 | 10/2003 | Fayyad et al. | |
| 6,633,992 B1 | 10/2003 | Rosen | |
| 6,647,383 B1 | 11/2003 | August et al. | |
| 6,662,180 B1 | 12/2003 | Aref et al. | |
| 6,687,702 B2 | 2/2004 | Vaitheeswaran et al. | |
| 6,704,805 B1 | 3/2004 | Acker et al. | |
| 6,718,535 B1 | 4/2004 | Underwood | |
| 6,742,003 B2 | 5/2004 | Heckerman et al. | |
| 6,757,708 B1 | 6/2004 | Craig et al. | |
| 6,795,793 B2 | 9/2004 | Shayegan et al. | |
| 6,807,537 B1 | 10/2004 | Thiesson et al. | |
| 6,842,761 B2 | 1/2005 | Diamond et al. | |
| 6,842,906 B1 | 1/2005 | Bowman-Amuah | |
| 6,879,944 B1 | 4/2005 | Tipping et al. | |
| 6,907,422 B1 | 6/2005 | Predovic | |
| 6,912,549 B2 * | 6/2005 | Rotter et al. | 707/200 |
| 6,922,695 B2 | 7/2005 | Skufca et al. | |
| 6,957,186 B1 | 10/2005 | Guheen et al. | |
| 6,990,636 B2 | 1/2006 | Beauchamp et al. | |
| 6,996,565 B2 | 2/2006 | Skufca et al. | |
| 7,035,809 B2 | 4/2006 | Miller et al. | |
| 7,043,476 B2 | 5/2006 | Robson | |
| 7,099,857 B2 | 8/2006 | Lambert | |
| 7,143,091 B2 | 11/2006 | Charnock et al. | |
| 7,155,427 B1 | 12/2006 | Prothia | |
| 7,181,459 B2 | 2/2007 | Grant et al. | |
| 7,249,131 B2 | 7/2007 | Skufca et al. | |
| 7,330,845 B2 | 2/2008 | Lee et al. | |
| 7,487,173 B2 | 2/2009 | Medicke et al. | |
| 7,526,486 B2 * | 4/2009 | Cushman et al. | 707/10 |
| 7,567,962 B2 | 7/2009 | Chakrabarti et al. | |
| 7,620,647 B2 | 11/2009 | Stephens et al. | |
| 7,627,550 B1 | 12/2009 | Adams et al. | |
| 7,685,093 B1 | 3/2010 | Adams et al. | |
| 7,698,268 B1 | 4/2010 | Adams et al. | |
| 7,788,274 B1 | 8/2010 | Ionescu | |
| 8,321,383 B2 | 11/2012 | Schumacher et al. | |
| 8,321,393 B2 | 11/2012 | Adams et al. | |
| 8,332,366 B2 | 12/2012 | Schumacher et al. | |
| 2002/0007284 A1 | 1/2002 | Schurenberg et al. | |
| 2002/0073099 A1 | 6/2002 | Gilbert et al. | |
| 2002/0080187 A1 | 6/2002 | Lawton | |
| 2002/0087599 A1 | 7/2002 | Grant et al. | |
| 2002/0095421 A1 | 7/2002 | Koskas | |
| 2002/0099694 A1 | 7/2002 | Diamond et al. | |
| 2002/0152422 A1 | 10/2002 | Sharma et al. | |
| 2002/0156917 A1 | 10/2002 | Nye | |
| 2002/0178360 A1 | 11/2002 | Wenocur et al. | |
| 2003/0004770 A1 | 1/2003 | Miller et al. | |
| 2003/0004771 A1 | 1/2003 | Yaung | |
| 2003/0018652 A1 | 1/2003 | Heckerman et al. | |
| 2003/0023773 A1 | 1/2003 | Lee et al. | |
| 2003/0051063 A1 | 3/2003 | Skufca et al. | |
| 2003/0065826 A1 | 4/2003 | Skufca et al. | |
| 2003/0065827 A1 | 4/2003 | Skufca et al. | |
| 2003/0105825 A1 | 6/2003 | Kring et al. | |
| 2003/0120630 A1 | 6/2003 | Tunkelang | |
| 2003/0145002 A1 | 7/2003 | Kleinberger et al. | |
| 2003/0158850 A1 | 8/2003 | Lawrence et al. | |
| 2003/0174179 A1 | 9/2003 | Suermondt et al. | |
| 2003/0182101 A1 | 9/2003 | Lambert | |
| 2003/0195836 A1 | 10/2003 | Hayes et al. | |
| 2003/0195889 A1 | 10/2003 | Yao et al. | |
| 2003/0195890 A1 | 10/2003 | Oommen | |
| 2003/0220858 A1 | 11/2003 | Lam et al. | |
| 2003/0227487 A1 | 12/2003 | Hugh | |
| 2004/0107189 A1 | 6/2004 | Burdick et al. | |
| 2004/0107205 A1 | 6/2004 | Burdick et al. | |
| 2004/0122790 A1 | 6/2004 | Walker et al. | |
| 2004/0143477 A1 | 7/2004 | Wolff | |
| 2004/0143508 A1 | 7/2004 | Bohn et al. | |
| 2004/0181526 A1 | 9/2004 | Burdick et al. | |
| 2004/0181554 A1 * | 9/2004 | Heckerman et al. | 707/104.1 |
| 2004/0220926 A1 | 11/2004 | Lamkin et al. | |
| 2004/0260694 A1 | 12/2004 | Chaudhuri et al. | |
| 2005/0004895 A1 * | 1/2005 | Schurenberg et al. | 707/3 |
| 2005/0015381 A1 | 1/2005 | Clifford et al. | |
| 2005/0015675 A1 | 1/2005 | Kolawa et al. | |
| 2005/0050068 A1 | 3/2005 | Vaschillo et al. | |
| 2005/0055345 A1 | 3/2005 | Ripley | |
| 2005/0060286 A1 | 3/2005 | Hansen et al. | |

| | | | |
|---|---|---|---|
| 2005/0071194 A1* | 3/2005 | Bormann et al. ............... 705/2 |
| 2005/0075917 A1 | 4/2005 | Flores et al. |
| 2005/0114369 A1 | 5/2005 | Gould et al. |
| 2005/0149522 A1 | 7/2005 | Cookson et al. |
| 2005/0154615 A1 | 7/2005 | Rotter et al. |
| 2005/0210007 A1 | 9/2005 | Beres et al. |
| 2005/0228808 A1 | 10/2005 | Mamou et al. |
| 2005/0240392 A1 | 10/2005 | Munro et al. |
| 2005/0256740 A1 | 11/2005 | Kohan et al. |
| 2005/0256882 A1 | 11/2005 | Able et al. |
| 2005/0273452 A1 | 12/2005 | Molloy et al. |
| 2006/0053151 A1 | 3/2006 | Gardner et al. |
| 2006/0053172 A1 | 3/2006 | Gardner et al. |
| 2006/0053173 A1 | 3/2006 | Gardner et al. |
| 2006/0053382 A1 | 3/2006 | Gardner et al. |
| 2006/0064429 A1 | 3/2006 | Yao |
| 2006/0074832 A1 | 4/2006 | Gardner et al. |
| 2006/0074836 A1 | 4/2006 | Gardner et al. |
| 2006/0080312 A1 | 4/2006 | Friedlander et al. |
| 2006/0116983 A1 | 6/2006 | Dettinger et al. |
| 2006/0117032 A1 | 6/2006 | Dettinger et al. |
| 2006/0129605 A1 | 6/2006 | Doshi |
| 2006/0129971 A1 | 6/2006 | Rojer |
| 2006/0136205 A1 | 6/2006 | Song |
| 2006/0161522 A1 | 7/2006 | Dettinger et al. |
| 2006/0167896 A1 | 7/2006 | Kapur et al. |
| 2006/0179050 A1 | 8/2006 | Giang et al. |
| 2006/0190445 A1 | 8/2006 | Risberg et al. |
| 2006/0195560 A1 | 8/2006 | Newport |
| 2006/0265400 A1 | 11/2006 | Fain et al. |
| 2006/0271401 A1 | 11/2006 | Lassetter et al. |
| 2006/0271549 A1 | 11/2006 | Rayback et al. |
| 2006/0287890 A1* | 12/2006 | Stead et al. ............... 705/3 |
| 2007/0005567 A1 | 1/2007 | Hermansen et al. |
| 2007/0016450 A1 | 1/2007 | Bhora et al. |
| 2007/0055647 A1 | 3/2007 | Mullins et al. |
| 2007/0067285 A1 | 3/2007 | Blume et al. |
| 2007/0073678 A1 | 3/2007 | Scott et al. |
| 2007/0073745 A1 | 3/2007 | Scott et al. |
| 2007/0094060 A1 | 4/2007 | Apps et al. |
| 2007/0150279 A1 | 6/2007 | Gandhi et al. |
| 2007/0192715 A1 | 8/2007 | Kataria et al. |
| 2007/0198481 A1 | 8/2007 | Hogue et al. |
| 2007/0198600 A1 | 8/2007 | Betz |
| 2007/0214129 A1 | 9/2007 | Ture et al. |
| 2007/0214179 A1 | 9/2007 | Hoang |
| 2007/0217676 A1 | 9/2007 | Grauman et al. |
| 2007/0250487 A1 | 10/2007 | Reuther |
| 2007/0260492 A1 | 11/2007 | Feied et al. |
| 2007/0276844 A1 | 11/2007 | Segal et al. |
| 2007/0276858 A1 | 11/2007 | Cushman et al. |
| 2007/0299697 A1 | 12/2007 | Friedlander et al. |
| 2007/0299842 A1 | 12/2007 | Morris et al. |
| 2008/0005106 A1 | 1/2008 | Schumacher et al. |
| 2008/0016218 A1 | 1/2008 | Jones et al. |
| 2008/0069132 A1 | 3/2008 | Ellard et al. |
| 2008/0120432 A1 | 5/2008 | Lamoureaux et al. |
| 2008/0126160 A1 | 5/2008 | Takuechi et al. |
| 2008/0243832 A1 | 10/2008 | Adams et al. |
| 2008/0243885 A1 | 10/2008 | Harger et al. |
| 2008/0244008 A1 | 10/2008 | Wilkinson et al. |
| 2008/0276221 A1 | 11/2008 | Lev et al. |
| 2009/0089317 A1 | 4/2009 | Ford et al. |
| 2009/0089332 A1 | 4/2009 | Harger et al. |
| 2009/0089630 A1 | 4/2009 | Goldenberg et al. |
| 2009/0198686 A1 | 8/2009 | Cushman, II et al. |
| 2010/0114877 A1 | 5/2010 | Adams et al. |
| 2010/0174725 A1 | 7/2010 | Adams et al. |
| 2010/0175024 A1 | 7/2010 | Schumacher et al. |
| 2011/0010214 A1 | 1/2011 | Carruth |
| 2011/0010401 A1 | 1/2011 | Adams et al. |
| 2011/0010728 A1 | 1/2011 | Goldenberg et al. |
| 2011/0047044 A1 | 2/2011 | Wright et al. |
| 2011/0191349 A1 | 8/2011 | Ford et al. |

FOREIGN PATENT DOCUMENTS

| | | |
|---|---|---|
| JP | 2005063332 | 3/2005 |
| JP | 2006163941 | 6/2006 |
| JP | 2006277413 | 10/2006 |
| WO | 9855947 A1 | 12/1998 |
| WO | 0159586 | 8/2001 |
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |
| WO | 2009042931 A1 | 4/2009 |
| WO | 2009042941 A1 | 4/2009 |

OTHER PUBLICATIONS

Fair, "Record Linkage in the National Dose Registry of Canada", European Journal of Cancer, vol. 33, Supplement 3, pp. S37-S43, Apr. 1997.

International Search Report and Written Opinion, for PCT/US2007/012073, Mailed Jul. 23, 2008, 12 pages.

International Preliminary Report on Patentability Issued in PCT/US2007/013049, Mailed Dec. 17, 2008.

International Search Report and Written Opinion issued in PCT/US2007/013049, mailed Jun. 13, 2008.

Office Action issued in U.S. Appl. No. 11/809,792, mailed Aug. 21, 2009, 14 pages.

Oracle Data Hubs: "The Emperor Has No Clothes?", Feb. 21, 2005, Google.com, pp. 1-9.

IEEE, no matched results , Jun. 30, 2009, p. 1.

IEEE, no matched results, 1 pg., Sep. 11, 2009.

Office Action issued in U.S. Appl. No. 11/522,223 dated Aug. 20, 2008, 16 pgs.

Office Action issued in U.S. Appl. No. 11/522,223 dated Feb. 5, 2009, Adams, 17 pages.

Notice of Allowance issued for U.S. Appl. No. 11/522,223, dated Sep. 17, 2009, 20 pages.

De Rose, et al. "Building Structured Web Community Portals: A Top-Down, Compositional, and Incremental Approach", VDLB, ACM, pp. 399-410, Sep. 2007.

Microsoft Dictionary, "normalize", at p. 20, Fifth Edition, Microsoft Corp., downloaded from http://proquest.safaribooksonline.com/0735614954 on Sep. 8, 2008.

Office Action issued in U.S. Appl. No. 11/521,928 dated Apr. 1, 2009, 22 pages.

Office Action issued in U.S. Appl. No. 11/521,928 dated Sep. 16, 2008, 14 pages.

Notice of Allowance issued for U.S. Appl. No. 11/521,928, dated Sep. 18, 2009, 20 pages.

Gopalan Suresh Raj, Modeling Using Session and Entity Beans, Dec. 1998, Web Comucopia, pp. 1-15.

Scott W. Ambler, Overcoming Data Design Challenges, p. 1-3, Aug. 2001.

XML, JAVA, and the future of the Web, Bosak, J., Sun Microsystems, Mar. 10, 1997, pp. 1-9.

Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115.

Hamming Distance, HTML. Wikipedia.org, Available: http://en.wikipedia.org/wiki/Hamming_distance (as of May 8, 2008).

Office Action Issued in U.S. Appl. No. 11/521,946 mailed May 14, 2008, 10 pgs.

Office Action issued in U.S. Appl. No. 11/521,946 mailed Dec. 9, 2008, 10 pgs.

Office Action issued in U.S. Appl. No. 11/521,946 mailed May 13, 2009, 12 pgs.

Freund et al., Statistical Methods, 1993, Academic Press Inc., United Kingdom Edition, pp. 112-117.

Merriam-Webster dictionary defines "member" as "individuals".

Waddington, D., "Does it signal convergence of operational and analytic MDM?" retrieved from the internet:<URL:http://www.intelligententerprise.com>, 2 pages, Aug. 2006.

International Search Report mailed on Oct. 10, 2008, for PCT Application No. PCT/US07/20311 (10 pp).

International Search Report and Written Opinion issued in PCT/US07/89211, mailing date of Jun. 20, 2008.

International Search Report and Written Opinion for PCT/US08/58404, dated Aug. 15, 2008.
International Preliminary Report on Patentability Under Chapter 1 for PCT Application No. PCT/US2008/058665, issued Sep. 29, 2009, mailed Oct. 8, 2009, 6 pgs.
International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
Martha E. Fair, et al., "Tutorial on Record Linkage Slides Presentation", Chapter 12, pp. 457-479.
International Search Report and Written Opinion mailed on Aug. 28, 2008 for Application No. PCT/US2008/58665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "OX-LINK: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
Jason Woods, et al., "Baja Identity Hub Configuration Process", Publicly available on Apr. 2, 2009, Version 1.3.
Initiate Systems, Inc. "Refining the Auto-Link Threshold Based Upon Scored Sample", Publicly available on Apr. 2, 2009; memorandum.
Initiate Systems, Inc. "Introduction", "False-Positive Rate (Auto-Link Threshold)", Publicly available on Apr. 2, 2009; memorandum.
Jason Woods, "Workbench 8.0 Bucket Analysis Tools", Publicly available on Apr. 2, 2009.
"Parsing" Publicly available on Oct. 2, 2008.
Initiate, "Business Scenario: Multi-Lingual Algorithm and Hub," Publicly available on Apr. 2, 2009.
Initiate, "Business Scenario: Multi-Lingual & Many-To-Many Entity Solutions", Publicly available on Apr. 2, 2009.
Initiate, "Relationships-MLH", presentation; Publicly available on Sep. 28, 2007.
Initiate, "Multi-Lingual Hub Support viaMemtype Expansion", Publicly available on Apr. 2, 2009.
Initiate Systems, Inc. "Multi-Language Hubs", memorandum; Publicly available on Apr. 2, 2009.
Initiate, "Business Scenario: Support for Members in Multiple Entities", Publicly available on Oct. 2, 2008.
Initiate, "Group Entities", Publicly available on Mar. 30, 2007.
Jim Cushman, MIO 0.5: MIO As a Source; Initiate; Publicly available on Oct. 2, 2008.
Initiate, "Provider Registry Functionality", Publicly available on Oct. 2, 2008.
Edward Seabolt, "Requirement Specification Feature #NNNN Multiple Entity Relationship", Version 0.1—Draft; Publicly available on Oct. 2, 2008.
Initiate, "Arriba Training Engine Callouts", presentation; Publicly available on Mar. 30, 2007.
Initiate, "Business Scenario: Callout to Third Party System", Publicly available on Oct. 2, 2008.
John Dorney, "Requirement Specification Feature #NNNN Conditional Governance", Version 1.0—Draft; Publicly available on Oct. 2, 2008.
Initiate, Release Content Specification, Identity Hub Release 6.1, RCS Version 1.0; Publicly available on Sep. 16, 2005.
Initiate, "Initiate Identity Hub™ Manager User Manual", Release 6.1; Publicly available on Sep. 16, 2005.
End User Training CMT; CIO Maintenance Tool (CMT) Training Doc; Publicly available on Sep. 29, 2006.
"HierarchyViewer—OGT 3.0t", Publicly available on Sep. 25, 2008.
"Building and Searching the OGT", Publicly available on Sep. 29, 2006.
Sean Stephens, "Requirement Specification B2B Web Client Architecture", Version 0.1—Draft; Publicly available on Sep. 25, 2008.
"As of: OGT 2.0", Publicly available on Sep. 29, 2006.
Initiate, "Java SDK Self-Training Guide", Release 7.0; Publicly available on Mar. 24, 2006.
European Communication for EP 07795659 (PCT/US2007013049) dated May 27, 2010.
Initiate, "Memtype Expansion Detailed Design", Publicly available on Apr. 2, 2009.
Ohgaya, Ryosuke et al., "Conceptual Fuzzy Sets—, NAFIPS 2002, Jun. 27-29, 2002, pp. 274-279. Based Navigation System for Yahoo!"
Xue, Gui-Rong et al., "Reinforcing Web-Object Categorization Through Interrelationships", Data Mining and Knowledge Discover, vol. 12, Apr. 4, 2006, pp. 229-248.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments—Exhibit A", Publicly available on Mar. 20, 2008.
Initiate, "Implementation Defined Segments—Gap Analysis", Publicly available on Mar. 20, 2008.
"Supporting Hierarchies", Publicly available on Nov. 29, 2007.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21. 2011. 4 pages.
European Search Report/EP07795659.7, Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Prelirinary Report on Patentability, PCT/US2007/89211, Apr. 30, 2012, 6 pages.
European Search Report/EP07705108.5, May 29, 2012, 6 pages.

* cited by examiner

PROCESSING RELATED DATA FROM INFORMATION SOURCES

TECHNICAL FIELD OF THE INVENTION

This invention relates generally to associating data records, and in particular to identifying data records that may contain information about the same entity such that these data records may be associated. Even more particularly, this invention relates to assembling or presenting data from information sources which comprise these data records.

BACKGROUND OF THE INVENTION

In today's day and age, the vast majority of businesses retain extensive amounts of data regarding various aspects of their operations, such as inventories, customers, products, etc. Data about entities, such as people, products, parts or anything else may be stored in digital format in a data store such as a computer database. These computer databases permit the data about an entity to be accessed rapidly and permit the data to be cross-referenced to other relevant pieces of data about the same entity. The databases also permit a person to query the database to find data records pertaining to a particular entity, such that data records from various data stores pertaining to the same entity may be associated with one another.

A data store, however, has several limitations which may limit the ability to find the correct data about an entity within the data store. The actual data within the data store is only as accurate as the person who entered the data, or an original data source. Thus, a mistake in the entry of the data into the data store may cause a search for data about an entity in the database to miss relevant data about the entity because, for example, a last name of a person was misspelled or a social security number was entered incorrectly, etc. A whole host of these types of problems may be imagined: two separate record for an entity that already has a record within the database may be created such that several data records may contain information about the same entity, but, for example, the names or identification numbers contained in the two data records may be different so that it may be difficult to associate the data records referring to the same entity with one other.

For a business that operates one or more data stores containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed, and prevent the user from picking the wrong data record, it is also desirable to identify and associate data records from the various information sources that may contain information about the same entity. There are conventional systems that locate duplicate data records within a database and delete those duplicate data records, but these systems may only locate data records which are substantially identical to each other. Thus, these conventional systems cannot determine if two data records, with, for example, slightly different last names, nevertheless contain information about the same entity. In addition, these conventional systems do not attempt to index data records from a plurality of different information sources, locate data records within the one or more information sources containing information about the same entity, and link those data records together. Consequently, it would be desirable to be able to associate data records from a plurality of information sources which pertain to the same entity, despite discrepancies between attributes of these data records and be able to assemble and present information from these various data records in a cohesive manner.

As data records from various information sources may be different in both format and in the data which they contain and the various information sources may themselves may heterogeneous, however, the assembling and presentation of data associated with these data records may be problematic. These problems may be exacerbated by the fact that some of the information in these data records may be confidential or otherwise sensitive, thus for various reasons (e.g. legal reasons, etc.) certain of the information in the data records can only be stored at the information sources themselves, and as explained above, multiple data records may exist which may refer to the same entity where each of these multiple data records may, in turn, have attributes which have multiple historical values. Given that these various data records may also reside in different information sources the complexity of the problems surrounding the assembling and presentation of related data from these various data records residing in multiple information sources becomes apparent.

Thus, there is a need for system and methods for assembling and presenting related data from information sources.

SUMMARY OF THE INVENTION

Systems and methods for managing data are disclosed. Embodiments of the present invention may allow attribute values associated with data records to be assembled and presented in a unified manner. More particularly, embodiments of the present invention may utilize a set of locally stored identity information associated with a data record to determine a set of logical procedures operable to retrieve values for one or more non-identity attributes from a remote location. Furthermore, other embodiments of the present invention may apply a logical procedure to the values of the attributes corresponding to data records to select one or more values of one or more attributes of the data records.

In one embodiment, obtaining one or more member data records, wherein each member data record is associated with a set of identity attributes and a set of non-identity attributes, values for the set of identity attributes corresponding to the member data record are stored locally and values for the set of non-identity attributes corresponding to the member data record are stored at a remote location; determining a first logical procedure corresponding to each of the non-identity attributes; and obtaining a value for each of the non-identity attributes, wherein obtaining the value comprises invoking the first logical procedure corresponding to the non-identity attribute In another embodiment, a response to the query a set of attributes from one or more of the data records may be processed using a second logical procedure to produce a final set of attributes and values for these final attributes from the values for the attributes of the one or more data records.

Embodiments of the present invention may provide the technical advantage of providing a centralized way to obtain data from a variety of different information source types and formats instead of having to compose custom code to get data from these other systems, at a potentially higher development cost.

Furthermore, embodiments of the present invention may allow a user to easily select the data he wishes to review with respect to a set of data records. This allows a singular view of data to be provided to consuming applications. This view can be defined to exactly match business requirements for the data.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein (e.g., generate an appropriate threat rating or threat score for each event.) Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). In one embodiment, the system and method of the invention may be particularly useful in a health care setting and thus examples of embodiments of the present invention may be described in this context. It will be appreciated, however, that embodiments of systems and methods in accordance with the invention have utility in a wide variety of other settings.

Before describing embodiments of the systems and methods of the present invention, it may first be helpful to go over examples of embodiments of systems and methods for associating entities which may be utilized in conjunction with embodiments of the present invention such as those described in U.S. Pat. No. 5,991,758, entitled "System and Method for Indexing Information about Entities from Different Information Sources", issued Nov. 23, 1999 by inventor Scott Ellard and U.S. patent application Ser. No. 11/656,111, entitled "Method and Systems for Indexing Information About Entities to Hierarchies from Different Information Sources", by inventors Scott Ellard and Jim Cushman filed on Jan. 22, 2007 which are both incorporated by reference in their entirety.

Figure 1:
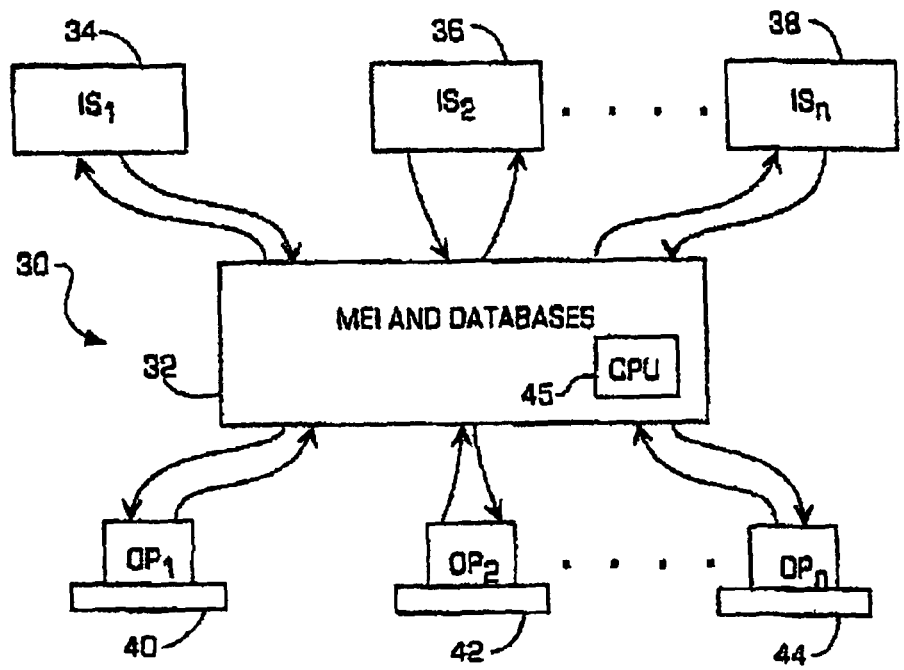
FIG. 1 is a block diagram illustrating one embodiment of a master entity index system.

FIG. 1 is a block diagram illustrating a master entity index system 30 in accordance with embodiments of the invention. The master entity index system may include a master entity index (MEI) 32 that processes, updates and stores data records about one or more entities from one or more information sources 34, 36, 38 and responds to commands or queries from a plurality of operators 40, 42, 44, where the operators may be either users or information systems. The MEI may operate with data records from a single information source or, as shown, data records from one or more information sources. The entities tracked using the MEI may include for example, patients in a hospital, participants in a health care system, parts in a warehouse or any other entity that may have data records and information contained in data records associated with it. The MEI may be a computer system with a central processing unit 45 executing a software application that performs the function of the MEI. The MEI may also be implemented using hardware circuitry.

As shown, the MEI 32 may receive data records from the information sources as well as write corrected data back into the information sources. The corrected data communicated to the information sources may include information that was correct, but has changed, information about fixing information in a data record or information about links between data records. In addition, one of the users 40-44 may transmit a query to the MEI 32 and receive a response to the query back from the MEI. The one or more information sources may be, for example, different databases that possibly have data records about the same entities. For example, in the health care field, each information source may be associated with a particular hospital in the health care organization and the health care organization may use the master entity index system to relate the data records within the plurality of hospitals so that a data record for a patient in Los Angeles may be located when that same patient is on vacation and enters a hospital in New York.

It will be apparent to those of ordinary skill in the art, that both the data sources 34, 36, 38 and the operators 40, 42, 44 may be affiliated with similar or different organizations or owners. For example, data source 34 may be affiliated with a hospital in Los Angeles run by one health care network, while data source 36 may be affiliated with a hospital in New York run by another health care network. Thus, the data records of each of data sources may be of a different format.

Figure 2A:
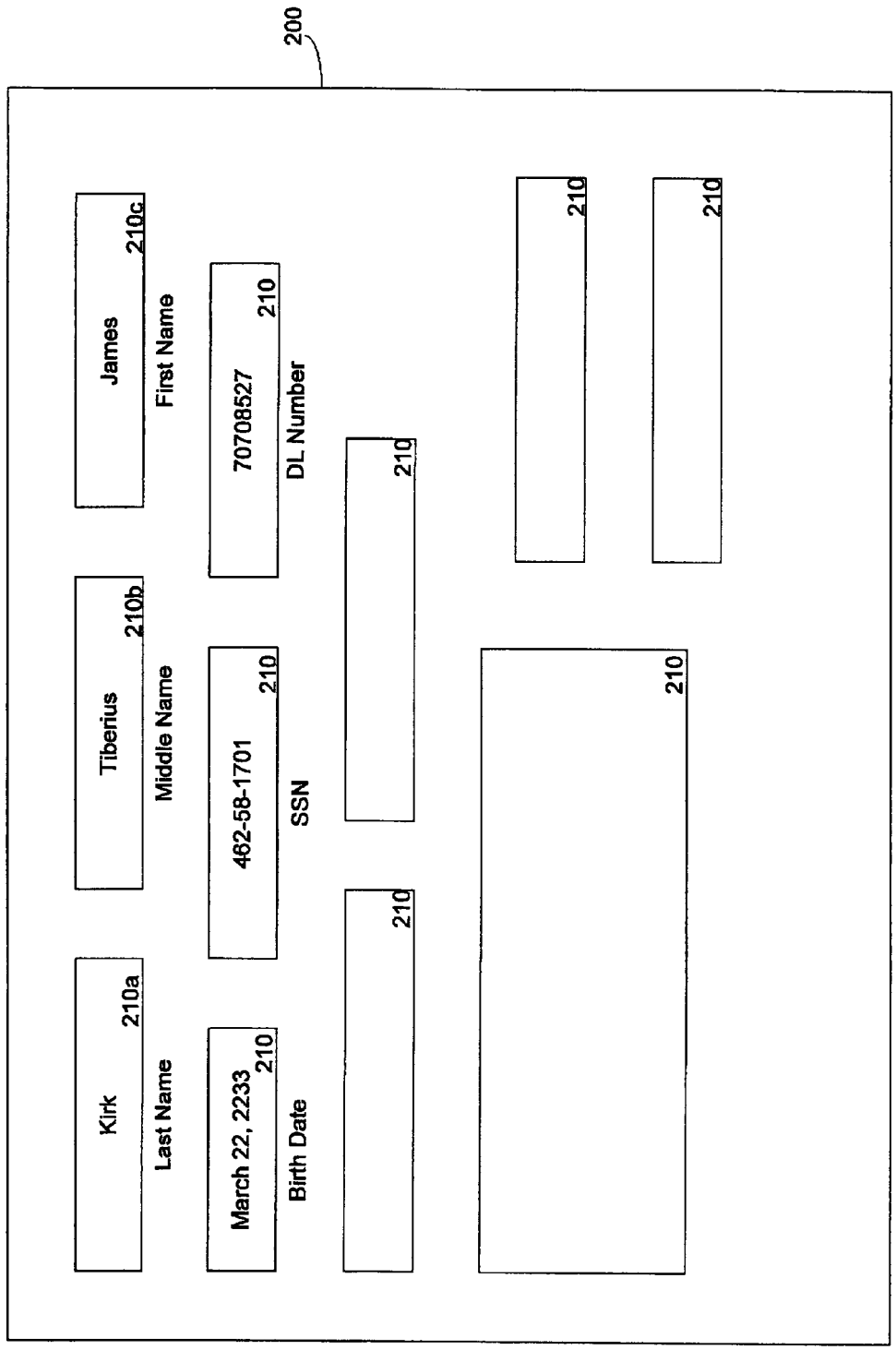
FIGS. 2A and 2B depict a representation of two embodiments of data records.
Figure 2B:
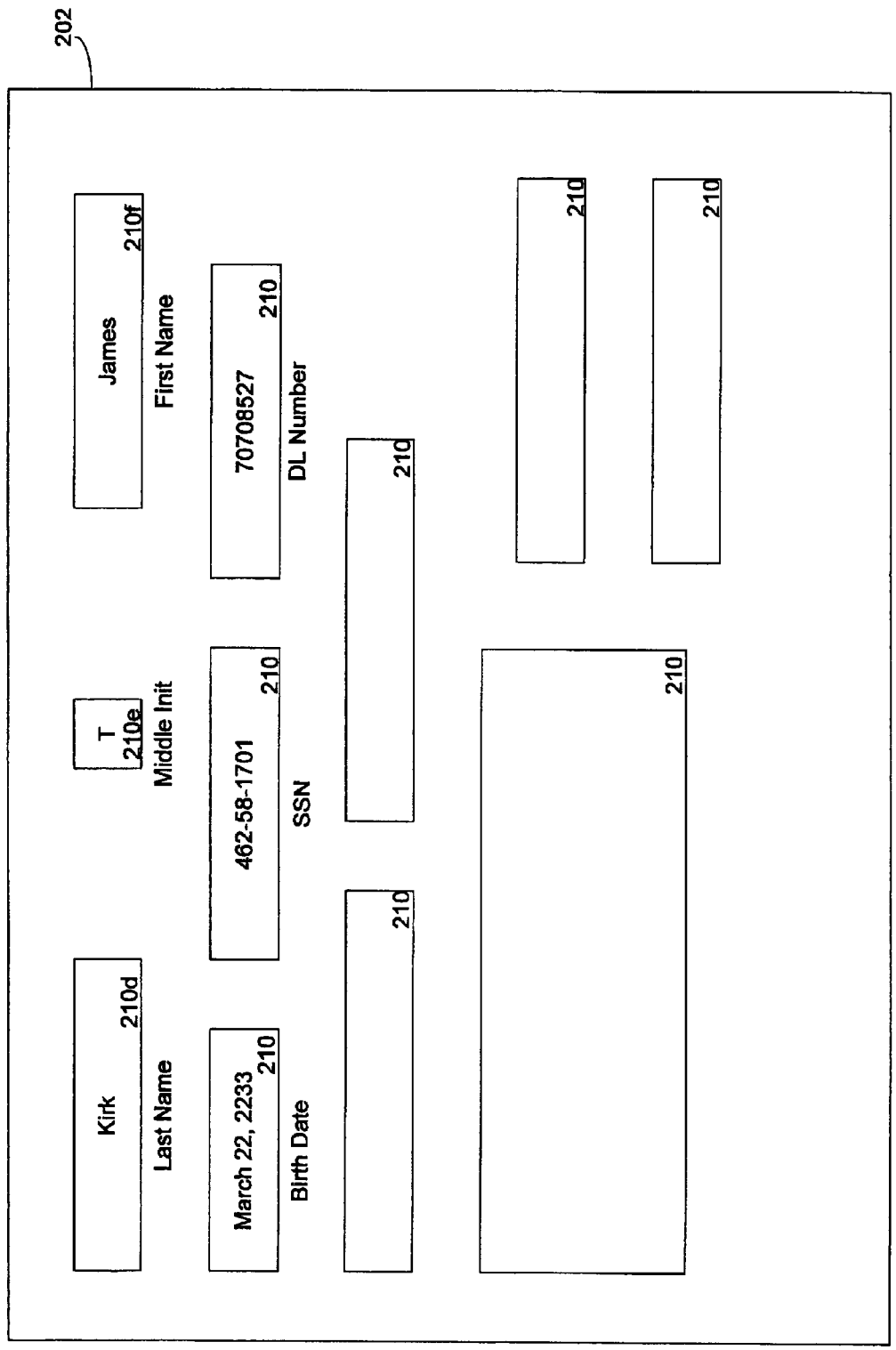

This may be illustrated more clearly with reference to FIGS. 2A and 2B, depicting two embodiments of example data records. Each of these data records 200, 202 has a set of fields 210 corresponding to a set of attributes of each of the data records. For example, one of the attributes of each of the records 200 may be a name, another attribute may be a social security number, birth date, gender, etc. It will be apparent that an attribute may comprise multiple fields 210 of a data record 200, 202, for example, the name attribute of data record 200 may comprise fields 210a, 210b and 210c, the last, middle and first name fields, respectively.

Notice, however, that each of the records may have a different format, for example data record 202 may have a field for the attribute of driver's license number, while data record 200 may have no such field. Similarly, like attributes may have different formats as well. For example, name fields 210a, 210b 210c in record 200 may accept the entry of a full first, last and middle name, while name fields 210d, 210e, 210f in record 202 may be designed for full first and last names, but only allow the entry of a middle initial.

Returning to FIG. 1, the MEI 32 of the master entity index system 30 may be located at a central location and the information sources and users may be located remotely from the MEI and may be connected to the MEI by, for example, a communications link, such as the Internet. The MEI, the one or more information sources and the plurality of users may also be connected together by a communications network, such as a wide area network. The MEI may have its own database that stores the complete data records in the MEI, but the MEI may also only contain sufficient data to identify or locate a data record (e.g. an address in a particular information source or an information source associated with the data record) or any portion of the values of the data fields that comprise a complete data record so that the MEI retrieves the entire data record, or portions thereof, from the information source when needed. The MEI may link data records together containing information about the same entity in an entity identifier or associative database, as described below, separate from the actual data record. Thus, the MEI may maintain links between data records in one or more information sources, but does not necessarily maintain a single uniform data record for an entity. Now, an example of the master entity index system in accordance with embodiments of present the invention will be described.

Figure 3:
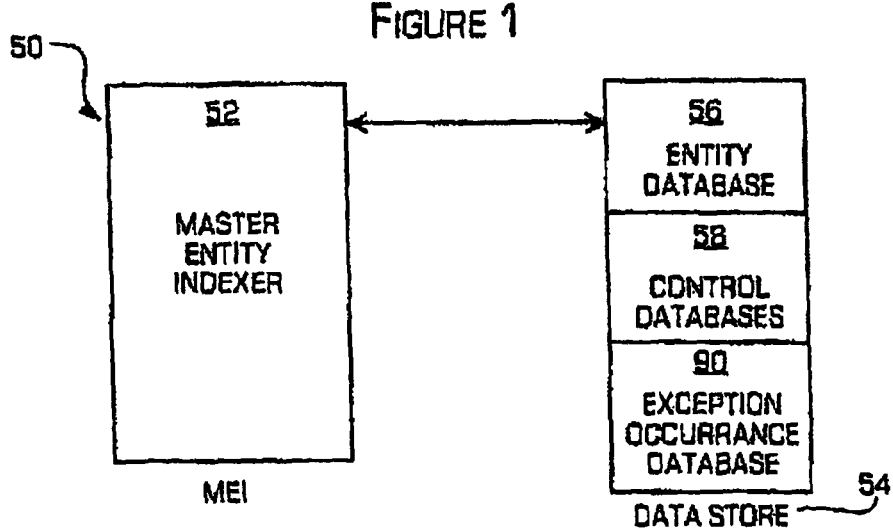
FIG. 3 is a block diagram illustrating one embodiment of a master entity index system.

FIG. 3 is a block diagram illustrating an example of a master entity index system 50 for a health care, or other, organization. In this example, the master entity index system may include a master entity index 52 and a data store 54. For clarity, the one or more information sources and the multiple users are not shown, but are connected to the master entity index 52 as previously described. The data store 54 may include an entity database 56, one or more control databases 58, and an exception occurrence database 90. The entity database may store data from the data records as specified above from the one or more information sources. The entity database may also separately store links between one or more data records when those data records contain information about the same entity. The entity database may also store an address of a large data record stored in one of the information sources to reduce the storage requirements of the entity database. In one example, the information about entities within the data records may be information about patients within a plurality of hospitals which are owned by a health care organization. The MEI 52 may process the data records from the one or more information sources located at each hospital, identify and associate records that contain information about the same entity, and generate the links between the separate data records when the data records contain information about the same patient.

As data records from the information sources are fed into the MEI, the MEI may store the incoming data record or portions thereof in the entity database according to a member type definition and may also attempt to match the incoming data record about an entity to a data record already located in the MEI database (referred to as member data records). If the incoming data record matches an existing data record, a link between the incoming data record and the matching data record may be generated. If the incoming data record does not match any of the existing data records in the MEI, a new entity identifier, as described below, may be generated for the incoming data record. Then as additional data records are received from the information sources, these data records are matched to existing data records and the MEI database of data records is increased.

The one or more control databases 58 may be used by the MEI to control the processing of the data records to increase accuracy. For example, one of the control databases may store rules which may be used to override certain anticipated erroneous conclusions that may normally be generated by the MEI. For example, the operator of the MEI may know, due to past experience, that the name of a particular patient is always misspelled in a certain way and provide a rule to force the MEI to associate data records with the known different spellings. The control databases permit the operator to customize the MEI for a particular application or a particular type of information. Thus, for a health care system containing information about a patient, the control databases may contain a rule that the nickname "Bill" is the same as the full name "William." Therefore, the MEI will determine that data records otherwise identical except for the first name of "Bill" and "William" contain information about the same entity and should be linked together. The MEI will now be described in more detail.

Figure 4:
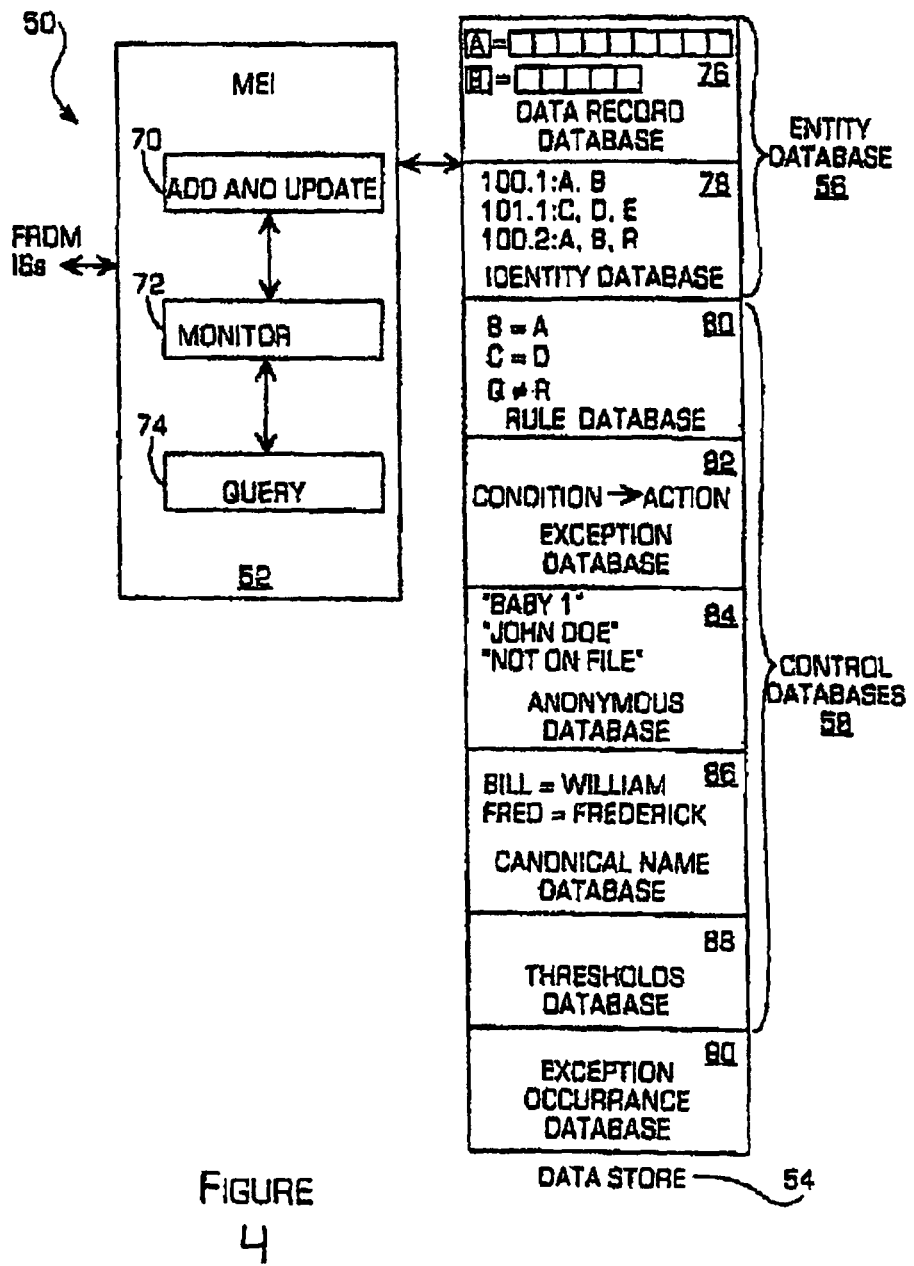
FIG. 4 is a block diagram illustrating one embodiment of a database associated with the master entity index.

FIG. 4 is a block diagram illustrating more details of the master entity index system 50, and in particular the MEI 52 and the data store 54. The MEI 52 may include an addition and updating unit 70, a monitor unit 72 and a query unit 74. The addition and updating unit may add data records about a new entity into the data store, update data records in the data store, or add new rules to the control databases. The monitor unit may permit a user of the master entity index system to view special conditions, known as exceptions, generated by the MEI. For example, a data record that requires a person to view the data record due to an error may be tagged and a message to the operator may be generated. The query unit permits a user of the master entity index system to query the MEI about information in the data records or information in the control databases of the MEI and the MEI will return a response to the query including any relevant data records or information. More details of these units and their associated functions will be described below.

For each of the operations of the MEI, including the synthesis, as described below, the querying and the monitoring, the results of those operations may depend on a trust value that may be associated with each data field in a data record. The trust computation for a data field may vary depending on the characteristics of the data field, such as the date on which that data record containing the field was received, or a quantitative characterization of a level of trust of the information source. For example, a data field containing data that was manually entered may have a lower trust value than a data field with data that was transferred directly from another information source. The trust value for a data field may also affect the probability of the matching of data records. Now, the data store 54 of the master entity index system will be described in more detail.

The MEI may provide other operations that can be constructed from combining the operations listed above. For example, an operation to process data records for which it is not known if a data record exists can be constructed by combining the query operation for data records with the add new data record or update existing data record operations. These "composite" operations may lead to better performance than if the operator executed a combination of the basic operations. They also relieve the operator for having to determine the correct sequencing of operations to achieve the desired result.

The data store 54 may include an entity database 56, one or more control databases 58, and an exception occurrence database 90 as described above. The entity database may include a data record database 76 and an identity database 78. The data record database may store the data records or the addresses of the data records in the MEI, as described above, while the associative identity database may store a group of data record identifiers that associate or "link" those data records which contain information about the same entity. The separation of the physical data records from the links between the data records permits more flexibility because a duplicate copy of the data contained in the data record is not required to be present in the identity database. The data record database and the associative database may also be combined if desired.

In one embodiment, the data record database may be configured according to one or more member type definitions where each member type definition which comprises a set of attributes of data records which are stored and managed in MEI system 32. The attributes of the member type definition may be grouped into identity data which comprises those attributes whose values are stored in data record database in conjunction with a data record. Conversely, non-identity attributes may be attributes whose values are not stored in data record database, and which may or may not be encompassed by the member type definition. For example, in a healthcare setting member type definition may comprise "Person", which is commonly used in a healthcare environments to accommodate management of person/patient data; "Provider", which is commonly used in healthcare provider/payor environments to accommodate management of network provider (e.g., medical centers, doctors, laboratories, etc.) data; "Guest", which is used in the hospitality environment to accommodate the management of guest/frequent guest data and "Company", which is used most often in non-healthcare environments, typically to manage information about companies rather than or in addition to information about customers.

For each data record corresponding to a member type definition, then, the set of identity information from the data record corresponding to that member type definition may be stored in data record database 76 along with a reference to an information source or location corresponding to the data record (e.g. the location of a data record in an information source from to which the member data record corresponds). It will be noted here that for each member type definition a different set of identity information (e.g. attributes) may be specified, and that only as much identity information corresponding to the member type definition as is available for that data record may be stored. For example, if a data record corresponds to a member type of "Person" the values for the name and address attributes of the data record may be stored in data record database if they are available. Furthermore, historical values may be stored for each of the identity attributes. For example, if a member type definition comprises an address attribute, a first address value may be stored for a member in data record database. At some later point the member data record (e.g. a data record corresponding to the member data record) may be updated with a new address. At this point the value for the address associated with the member data record may be updated to the new address and the first address value stored as a historical value for the address attribute associated with that member. It will be noted that the number of historical values for each identity attribute may differ according to the identity attribute and may be as few or as many as desired in a given embodiment of the present invention.

The identity database represents the combination of data records in the data record database that refer to the same entity. Each entity is assigned an entity identifier. Entity identifiers are based on the concept of "versioned" identification. An entity identifier consists of a base part and a version number. The base part represents a specific individual about whom information is being linked. The version number represents a specific combination of data records that provides information about the entity that is known at a specific time. In this example, the data records are shown as squares with the alphabetic identifier of the data record inside, and the entity identifier is shown as the base part followed by a period followed by a version number. For example, "100.0" indicates an entity identifier with 100 as the base part and 1 as the version number. In this example, entity identifier 100.0 links data records A and B, entity identifier 101.0 links data records C, D and E, and entity identifier 101.1 links data records A, B, and R. Now, the details of the control databases will be described.

The one or more control databases 58 may permit the operator of the master entity index system to customize the MEI's processing based on information known to the operator. The control databases shown are merely illustrative and the MEI may have additional control databases which further permit control of the MEI by the operator. The control databases may, for example, include a rules database 80, an exception handling database 82, an anonymous name database 84, a canonical name database 86, and a thresholds database 88.

The rules database may contain links that the operator of the system has determined are certain and should override the logic of the matching of the MEI. For example, the rules database may contain identity rules (i.e., rules which establish that a link exists between two data records) and/or non-identity rules (i.e., rules which establish that no link exists between two data records). In this example, the rules database contains identity rules which are A=B and C=D and a non-identity rule which is Q.notequal.R. These rules force the MEI to establish links between data records or prevent links from being established between data records. For example, the information sources may have four patients, with data records S, T, U, and V respectively, who are all named George Smith and the operator may enter the following nonidentity rules (i.e. S.notequal.T, T.notequal.U, U.notequal.V, V.notequal.S) to keep the data records of the four different entities separate and unlinked by the MEI. The rules in the rules database may be updated, added or deleted by the operator of the master entity index system as needed.

The exception handling database 82 contains one or more exception handling routines that permit the master entity index system to handle data record problems. The exception handling rules within the database may have the form of "condition.fwdarw.action" processing rules. The actions of these rules may be actions that the MEI should automatically take in response to a condition, for example, to request that an individual manually review a data record. An example of an exception handling rule may be, "if duplicate data record.fwdarrow.delete data record" which instructs the MEI to delete a duplicate data record. Another example is, "if different attributes (sex).forwardarrrow.request further review of data record" which instructs the MEI that if there are two data records that appear to relate to the same entity, but the sex of the entity is different for each data record, the MEI should request further review of the data records. In response to this request, an operator may determine that the data records are the same, with an incorrectly typed sex for one of the records and the operator may enter a rule into the rules database that the two data records are linked together despite the difference in the sex attribute. The exception database may have an associated database 80. (described below) which stores the actual exceptions that occur during processing of the input data records.

The anonymous name database 84 permits the MEI to automatically recognize names that should be ignored for purposes of attempting to match two data records. In this example, the anonymous name database may contain "not on file", "John Doe" and "baby.subtext.-- 1" which are names that may be typically assigned by a hospital to a patient when the hospital has not yet determined the name of the patient. As another example, a part not in a warehouse inventory may be referred to as "not on file" until the part may be entered into the database. These anonymous names may be used by the MEI to detect any of the anonymous names or other "filler" data that hold a space, but have no particular meaning in data records and ignore those names when any matching is conducted because a plurality of data records containing the name of "John Doe" should not be linked together simply because they have the same name.

The canonical name database 86 may permit the MEI to associate short-cut data, such as a nickname, with the full data represented by the short-cut data, such as a person's proper name. In this example for a health care organization, the nickname Bill may be associated with William and Fred may be associated with Frederick. This database permits the MEI to link together two data records that are identical except that one data record uses the first name Bill while the second data record uses the first name William. Without this canonical name database, the MEI may not link these two data records together and some of the information about that patient will be lost. The thresholds database 88 permits the thresholds used by the MEI for matching data records, as described below, to be adjustable. For example, an operator may set a high threshold so that only exact data records are matched to each other. A lower threshold may be set so that a data record with fewer matching data fields may be returned to the user in response to a query. The details of the matching method will be described below in more detail.

The exception occurrence database 90 allows the MEI to maintain a record of all of the exceptions that have occurred. The exception occurrence database may store the actual exception conditions that have arisen during processing. For example, the exception occurrence database may contain an entry that represents that entity 100.2 has two data records with different values for the "sex" attribute.

The operator of the MEI may clear the identity database 78 without clearing the data record database 76. Thus, an operator may have the MEI receive a plurality of input data records and generate a plurality of links with a particular matching threshold level, as described below, being used. The operator may then decide to perform a second run through the data using a lower matching threshold level to produce more links, but does not want to delete the data records themselves, and does not want to delete the identity and non-identity rules from the rules database created during the first run through the data. Thus, the operator may delete the identity database, but keep the control databases, and in particular the rules database, for the second run through the data.

As discussed above the query unit permits a user of the master entity index system to query the MEI about information in the data records or information in the control databases of the MEI and the MEI will return a response to the query including any relevant data records or information. In one embodiment, for example, a user may query the MEI utilizing one or more criteria and the MEI will respond to the query with data corresponding to a set of member data records determined based on the criteria. More particularly, MEI may provide an application programming interface (API) such that a user may submit a query comprising one or more criteria and the MEI utilize the criteria to obtain a response to the query, where the response comprises a set of member data records, and return data corresponding to these member data records to the user. In one embodiment, the result of the query returned to the user may comprise sets of attribute values or other information where each set of attribute values corresponds to at least one of the member data records.

For various reasons, such as regulatory laws or codes (e.g. the Health Insurance and Portability and Accountability Act or HIPAA), privacy concerns, concerns about storage space or efficiency, etc. however, it may not be desirable to store all the values of all the attributes or other information associated with a data record in data store 54 (e.g. in conjunction with a member data record). Thus, in addition to any identity information (e.g. attributes whose values are stored in data store 54 of MEI) comprised by a member type definition, in one embodiment, as discussed above, a member data record may be associated with a set of non-identity information (e.g. attributes whose values are stored externally to data store 54 of MEI).

Thus, the values for the non-identity attributes associated with a particular member data record may be stored at an information source 34, 36, 38 which stores the data record corresponding to that member data record and the values for the identity attributes of the member data record stored in the data record database (and which may also be stored at the information source 34, 36, 38 in conjunction with the data record corresponding to that member data record). By only storing identity information (e.g. values for identity attributes) for a member data record at MEI 32 the amount of data stored in data store 54 may be reduced and, by tailoring the identity information stored at data store 54 according to any pertinent laws, regulation, or desires of owners of information sources 34, 36, 38 these various laws, regulations, desires, etc. may be accounted for with regards to the storage of member data record data.

This arrangement, however, may present a number of difficulties. One of these difficulties is how to manage data stored in these disparate locations (e.g. in data store 54 and multiple information sources 34, 36, 38). Specifically, each of information sources 34, 36, 38 may not be managed by MEI 32 and may utilize any one of a number of formats, protocols, etc. Thus, to collect information corresponding to a member data record (e.g. both identity and non-identity information) on a particular member data record, attribute values associated with that member data record may need to be obtained from both data store 54 and from one or more information sources 34, 36, 38. It may be desirable, however, to present a unified view of a member record or entity to a user. In other words, to allow the gathering and storage of the various values of attributes associated with member data records to be transparent to a user of MEI.

To that end, attention is now directed to systems and methods for managing data stored in disparate locations. Embodiments of the present invention may allow attribute (or other) values associated with one or more member data records to be assembled and presented in a unified manner. More particularly, embodiments of the present invention may utilize a set of locally stored identity information associated with a member data record to determine a set of logical procedures corresponding to a set of externally stored non-identity information associated with the member data record. Each of this set of logical procedures may be operable to implement logic to retrieve values for one or more non-identity attributes from an information source.

Figure 5:
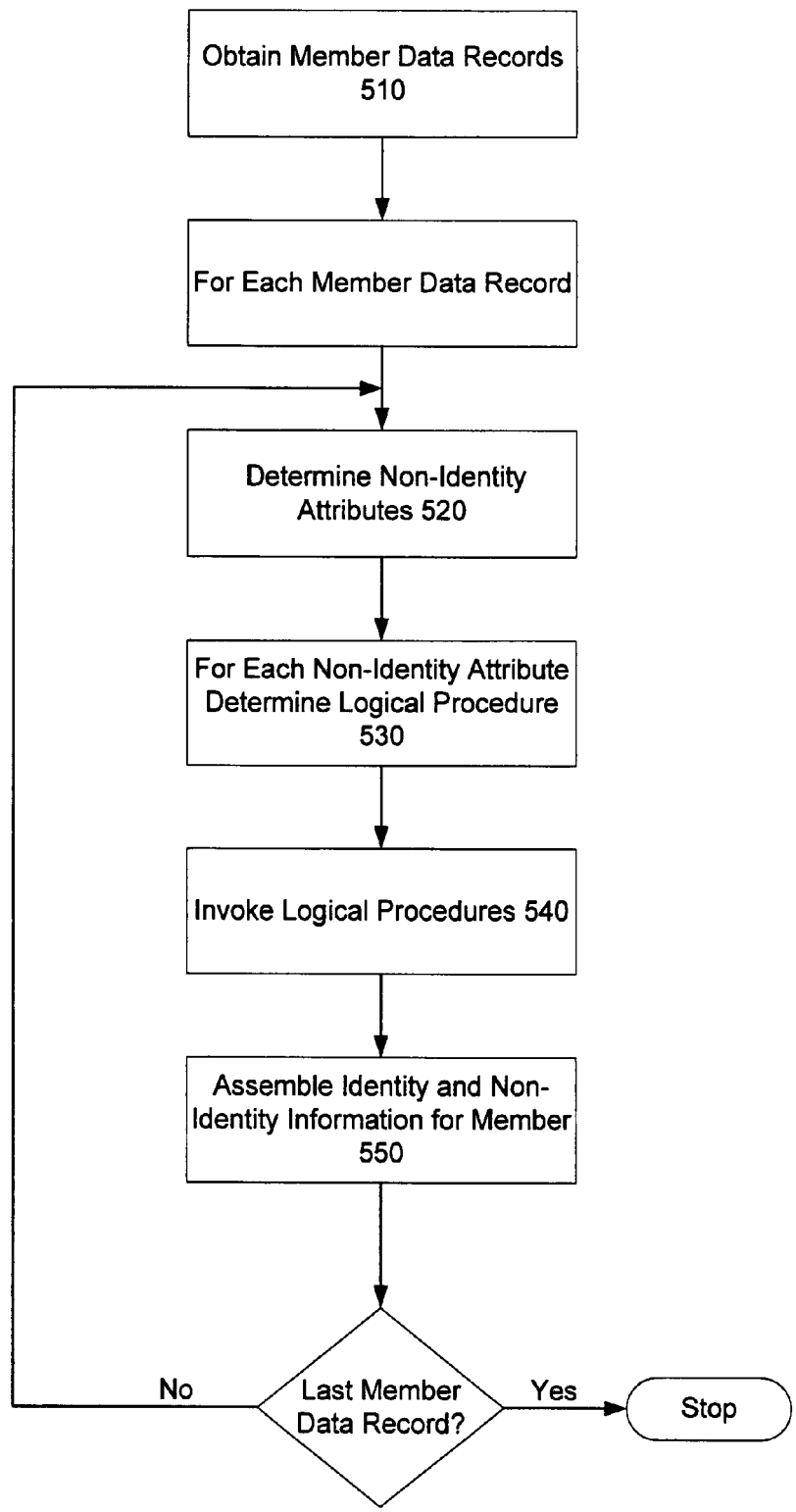
FIG. 5 is a flow diagram illustrating one embodiment of a method for managing data.

Turning to FIG. 5 a flow diagram of one embodiment of a method for managing data stored externally (e.g. in information sources) in conjunction with data stored locally (e.g. in data store 54 of MEI) is depicted. At step 510 MEI may generate or otherwise obtain a set of member data records. These member data records may be generated in response to a query received from an operator 40, 42, 44 as will be discussed later. Each of these members data record may comprise the set of identity information (e.g. values for identity attributes) associated with that member data record (e.g. stored in data store 54). Based on the member type definition to which the member data record corresponds a set of attributes whose values are non-identity information (e.g. not stored in data store 54) may be determined at step 520. For each of these non-identity attributes of these member data records, a logical procedure may be determined at step 530 to obtain values for the non-identity attributes for each of the members, if it exists, and these logical procedures invoked at step 540. A logical procedure may have a defined set of inputs and outputs (for example, based on the attribute type and an associated member type definition) and comprise logic operable to retrieve the value for a particular non-identity attribute from an information source. This retrieval may entail communication with a particular information source according to the protocol or format utilized by that information source, or may entail the invocation of a web service provided by that information source, or almost any other type of communication. For each of the member data records then, the values of the non-identity attributes obtained by each of the logic flows invoked at step 540 may be assembled with the identity information stored locally in data store 54 according to the member type definition or other format at step 550.

Figure 6:
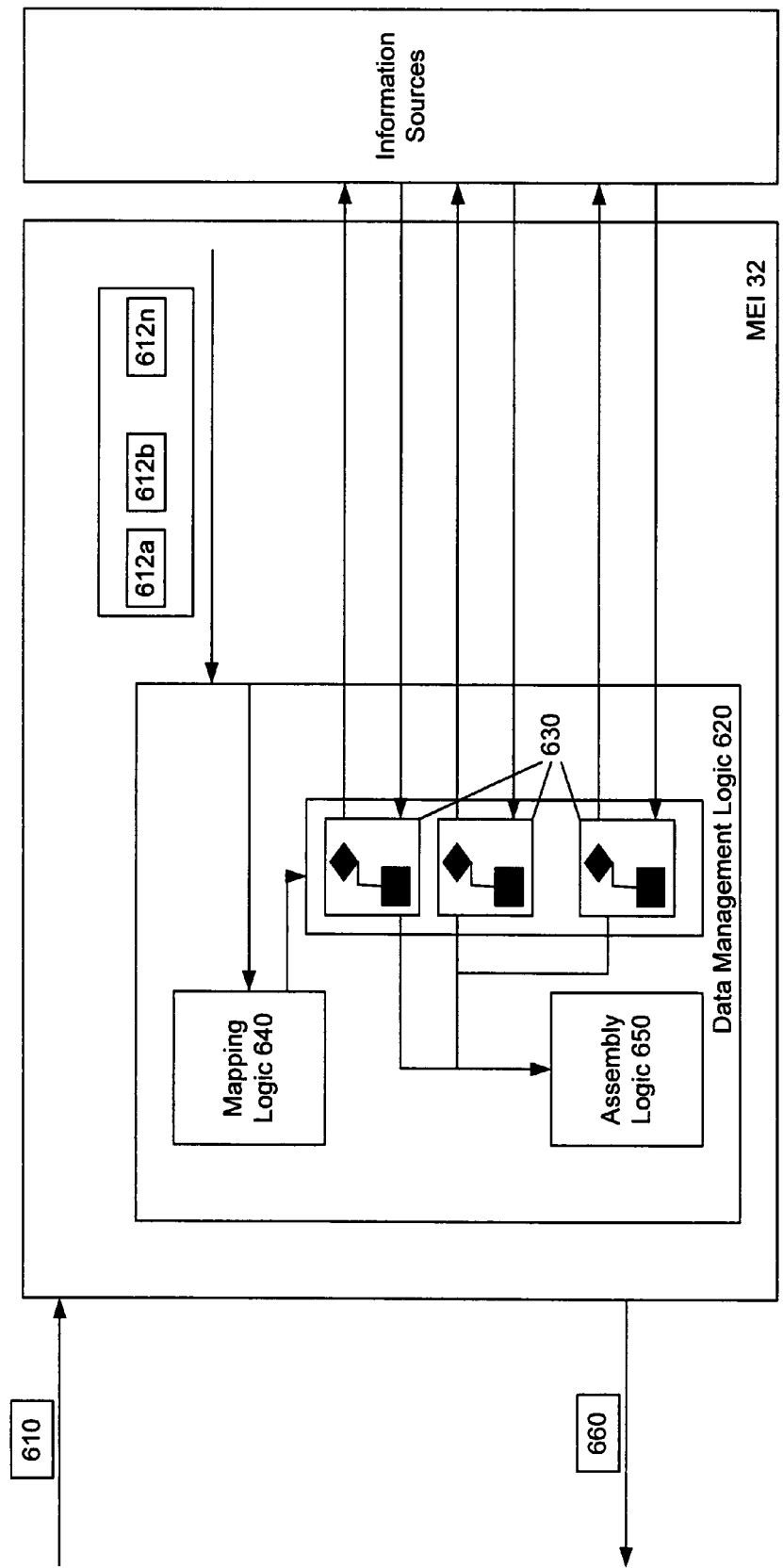
FIG. 6 is a block diagram illustrating one embodiment of processing for data management.

The embodiment of the methodology depicted in FIG. 5 may be better explained with reference to FIG. 6 which depicts an example of one embodiment of managing data stored in disparate locations in conjunction with responding to a query from a user. MEI 32 may receive query 610 from a user. Query 610 may comprise a set of criteria provided by the user and a set of desired results which may comprise a set of attributes, member data records, or entities. For example, a request may comprise a name (e.g. such as "John") and the desired results may comprise the attributes of patient record and an order history. As noted above, request 610 may be formed according to an API provided by MEI 32. Based on this query 610, MEI 32 may obtain a set of member data records 612a,b . . . n utilizing the set of criteria in query 610 and provide these member data records 612 to data management logic 620. Each of member data records 612 may be of a particular member data type and comprise identity information for the member data record which may include an associated information source for the member data record 612. Using an attribute map corresponding to the member data type mapping logic 640 may reference a set of logical procedures 630, where each of the set of logical procedure 630 may be operable to retrieve a value for a non-identity attribute associated with the member data record from an information source. More particularly, in one embodiment each of logical procedures 630 may be invoked with at least a portion of the identity information associated with the member data record 612 and may utilize this identity information to access an information source to retrieve values for the non-identity attribute associated with the logical procedure 630.

Using the identity information associated with the member data record 612 and the attribute values retrieved by each of logical procedures 630, assembly logic 650 may assemble a result to return to the initiator of query 610. This result may be assembled according to an API provided by MEI 32, or another format, and may correspond to the API with which query 610 was initiated. In one particular embodiment, the format of the assembled result may correspond to the member type definition for the member data record. Result 660 assembled by assembly logic 650 may then be returned to the initiator of query 610.

It may be helpful here to reference a particular example. For purposes of this example, therefore, assume that MEI 32 has a member type definition for a person which comprises four attributes, a "Name" attribute, a "Patient Record" attribute, an "Order History" attribute and an "Invoice No." attribute. The identity information corresponding to this member type definition is a value for the "Name" attribute. Now suppose that query 610 comprises a particular name as a criterion and based upon this criterion MEI 32 locates two member objects 612*a* and 612*b*. Member object 612*a* is associated with information source 34 while member object 612*b* is associated with information source 36.

Figure 7:
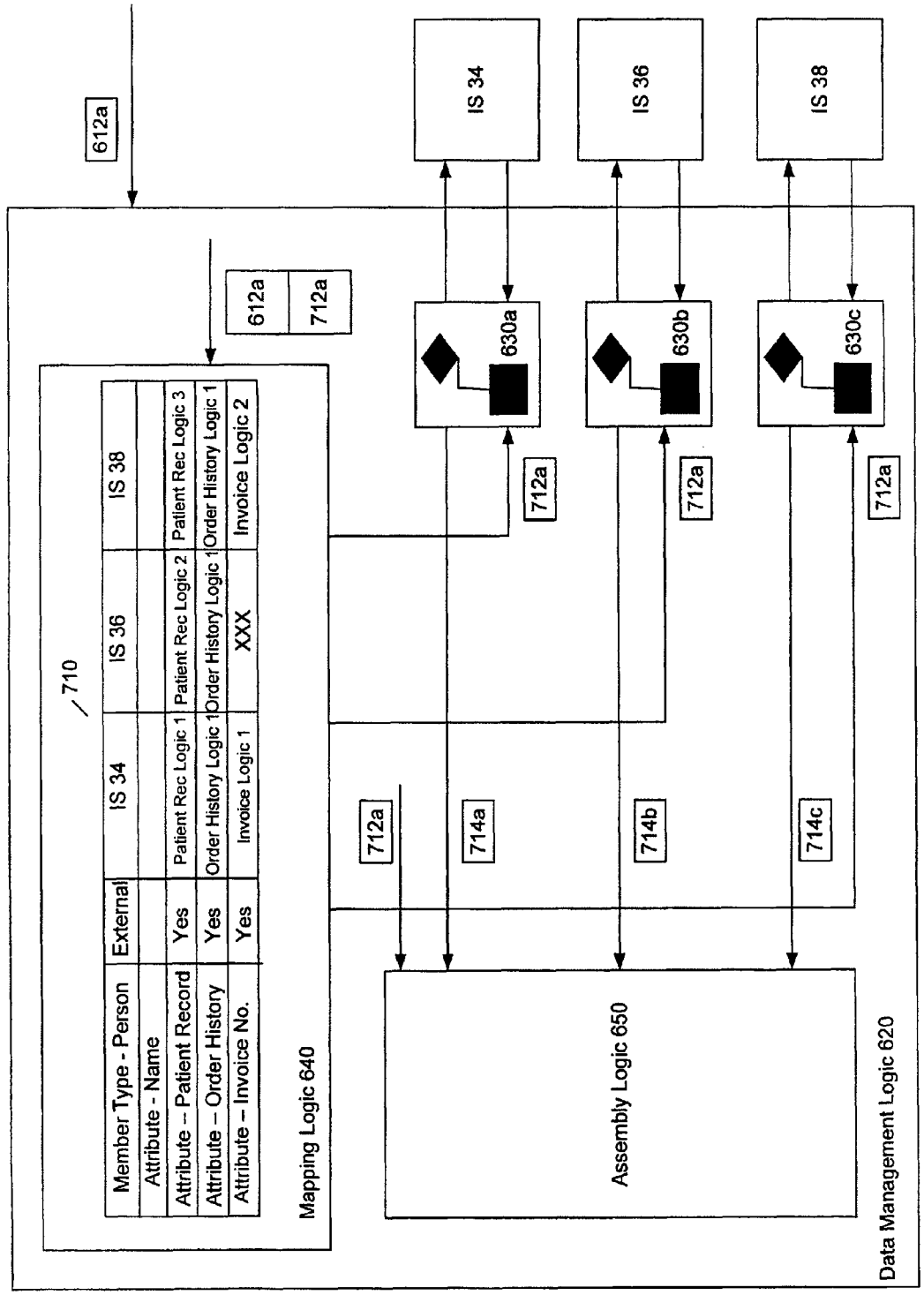
FIG. 7 is a block diagram illustrating an example of one embodiment of data management.
Figure 8:
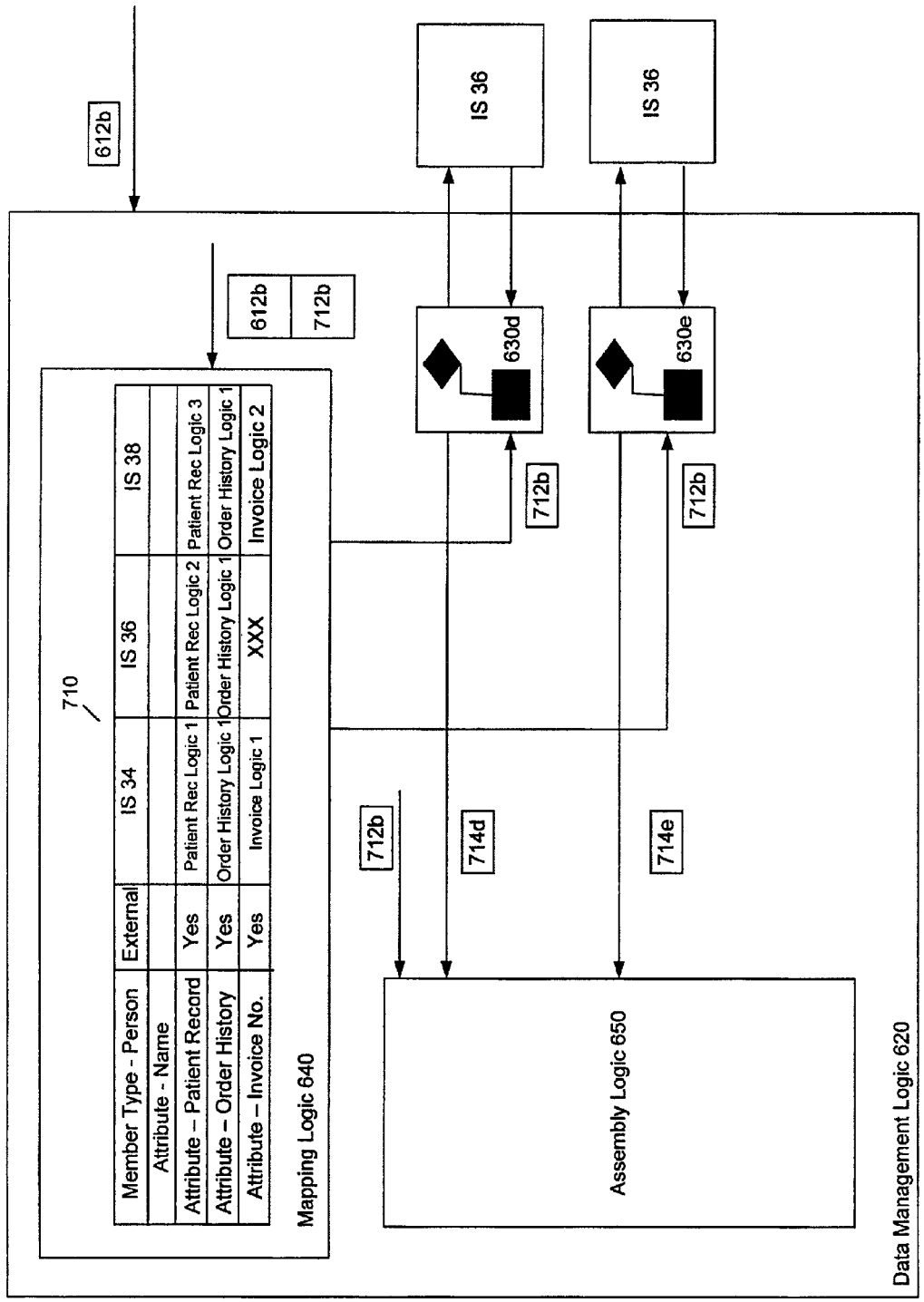
FIG. 8 is a block diagram illustrating an example of one embodiment of data management.

FIGS. 7 and 8 depict the processing of member data records 612*a* and 612*b* respectively. Referring first to FIG. 7, a block diagram of one embodiment of the processing of member data record 612*a* of the current example is depicted. Member data record 612*a* may be provided to data management logic 620 (e.g. including the identity information 712*a* associated with member data record 612*a*) which in this case may comprise a value for the "Name" attribute associated with member data record 612*a*. Mapping logic 640 may then utilize table 710 to determine a set of logical procedures 630 to obtain values for the non-identity attributes (e.g. external to MEI) of member data record 612*a*. In the example depicted, as member data record 612*a* is associated with information source 34, mapping logic 640 may determine that the "Name" attribute is not a non-identity attribute and therefore no logical procedure needs to be determined for this attribute. Mapping logic 640 may also determine, based on the information source associated with member data record 712*a* (e.g. IS 34), that the "Patient Rec 1" procedure should be invoked to obtain the value for the "Patient Record" attribute of member data record 612*a*, that the "Order History Logic 1" procedure should be invoked to obtain the value for the "Social Security No." attribute of member data record 612*a* and that the "Invoice Logic 1" procedure should be invoked to obtain the value for the "Invoice No." attribute of member data record 612*a*.

Each of those logical procedures 630 may then be invoked and provided with the identity information 712*a* (e.g. the value of the "Name" attribute) associated with member data record 612*a*. In this example, logical procedure 630*a* may be "Patient Rec Logic 1" operable to obtain the value 714*a* of the "Patient Record" attribute associated with member data record 612*a* from information source 34, logical procedure 630*b* may be "Order History Logic 1" operable to obtain the value 714*b* for the "Order History" attribute associated with member data record 612*a* from information source 36 and logical procedure 630*c* may be "Invoice Logic 2" operable to obtain the value 714*c* for the "Invoice No." attribute associated with member data record 612*a* from information source 38.

The identity information 712*a* associated with member data record 612*a* can then be provided to assembly logic 650 along with each of the values 714 for the attributes obtained by logical procedures 630*a*, 630*b*, 630*c* (e.g. non-identity information). The identity information 712*a* and non-identity information corresponding to member data record 612*a* may then be formatted or otherwise processed (e.g. according one or more logical procedures as explained in more detail below) by assembly logic 650 and returned to the operator 40, 42, 44 which initiated a query.

Moving now to FIG. 8, a block diagram of one embodiment of the processing of member data record 612*b* of the current example is depicted. Member data record 612*b* may be provided to data management logic 620 (e.g. including the identity information 712*b* associated with member data record 612*b*) which in this case may comprise a value for the "Name" attribute associated with member data object 712*b*. Mapping logic 640 may then utilize table 710 to determine a set of logical procedures 630 to obtain values for the non-identity attributes (e.g. external to MEI) of member data record 612*b*. In the example depicted, as member data record 612*b* is associated with information source 36, mapping logic 640 may determine that the "Name" attribute is not a non-identity attribute and therefore no procedure needs to be determined for this attribute. Mapping logic 640 will also determine based on the information source associated with member data record 612*b* (e.g. IS 36) that the "Patient Rec Logic 2" procedure should be invoked to obtain the value for the "Patient Record" attribute of member data record 612*b*, that the "Order History Logic 1" procedure should be invoked to obtain the value for the "Order History" attribute of member data record 612*b* and that no logical procedure should be invoked to obtain the value for the "Invoice No." attribute of member data record 612*b* (e.g. because no value for "Invoice No." which corresponds to member data record 612*b* may be stored).

Each of those logical procedures 630 may then be invoked and provided with the identity information 712*b* (e.g. the value of the name attribute) associated with member data record 612*b*. In this example, logical procedure 630*d* may be "Patient Rec Logic 2" operable to obtain the value 714*d* of the "Patient Record" attribute associated with member data record 612*b* from information source 36 and logical procedure 630*e* may be "Order History Logic 1" operable to obtain the value 714*e* for the "Order History" attribute associated with member data record 612*b* from information source 36.

The identity information 712*b* associated with member data record 612*b* can then be provided to assembly logic 650 along with each of the values 714 for the attributes obtained by logical procedures 630*d*, 630*e* (e.g. non-identity information). The identity information 712*b* and non-identity information corresponding to member data record 612*b* may then be processed by assembly logic 650 to form a result and the result returned to the user which initiated the query.

A few things will be noted after a review of the above example. First, it will be observed that one logical procedure may be associated with the retrieval of a value of an attribute of a member data record from multiple information sources or individual logical procedures for the retrieval of the value of an attribute may be defined for individual data sources, or any combination thereof. In other words, logical procedures may be tailored or otherwise operable to interact with one or more of the information sources to obtain a value according to almost any type of communication protocol, storage format, etc utilized by an information source or otherwise desired. Furthermore, each of logical procedures may accomplish almost any type of processing on these values, such as parsing of the obtained values, etc.

The definition of these various logical procedures may also occur in almost any manner desired. In one embodiment, for example, a user may utilize a graphical interface to define each of the logical procedures where the graphical interface may offer a set of visual representations of functionality which the user may assemble and a logical procedure instantiated from the graphical representation created by the user. These logical procedures may also be hard coded during installation or configuration of MEI, the logical procedures may be provided by one or more third party vendors, etc.

Using embodiments of the present invention a variety of other functionality may also be implemented in managing data stored in disparate locations. For example, data management logic 620 may receive a user identification along with the set of member data object and based upon this user identification apply a set of permissions to the identity attributes and non-identity attributes to determine if the user represented by the user identification has permission to receive values for these attributes such that assembly logic 650 may assemble a reply to a query based on these permissions. A wide variety of these security protocols may similarly be implemented, such that only values of certain attributes associated with member data records may be accessed.

Embodiments of the present invention may also be utilized to determine which values of attributes are to be returned in response to a query from a user. In many cases, a member data record which is to be returned in response to a user request, or an entity to be returned to a user in response to a query (which may be comprised of multiple member data records) may have multiple values associated with one or more of the attributes associated with the member data record or the entity. For example, a member data record may have two or more values corresponding to a name attribute, where one value is the current value of the name attribute for the member data record and another value for the name attribute may be a historical value for the name attribute. Similarly, an entity may comprise two or more linked member data records where one of the member data records of the entity may have one value for a name attribute and another member data record associated with the entity may have a different value for the name attribute. If each of these values for a member data record or entity is returned to a user in response to a query it may require a great deal of review for a user to locate the values or information that he desires. Thus, it would be desirable if the values of attributes associated with member data records and entities could be refined or composited according to a user's desires before being returned to a user.

To address this desire, among others, attention is now directed to systems and methods for refining or compositing one or more member data records. More particularly, embodiments of the present invention may apply a logical procedure to the values of attributes corresponding to one or more data records to select one or more values of one or more attributes. Specifically, embodiments of the invention may apply a logical procedure referenced in a user query to composite member data records obtained as a result of the query, such that the response to the query comprises the values for attributes as determined by the application of the logical procedure. A variety of these logical procedures may be defined such that a user may easily obtain desired results through the selection of one or more of these logical procedures.

Figure 9:
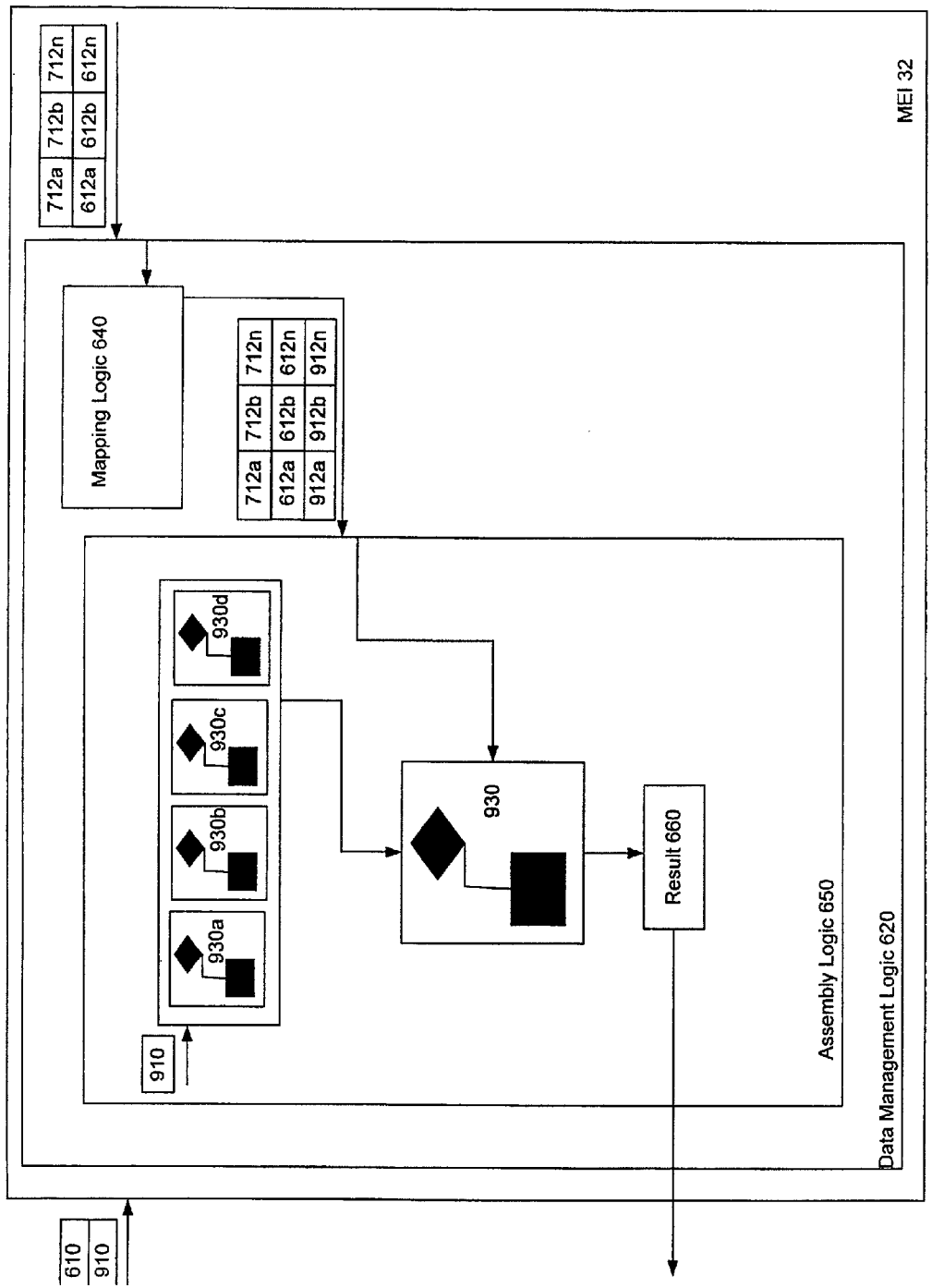
FIG. 9 is a block diagram illustrating an example of one embodiment of data management.

Embodiments of the systems and methods of the present invention may be better understood with reference to FIG. 9 which depicts one embodiment of utilizing a logical procedure for the compositing of member data records. As discussed above, in response to a query 610 from a user, data management logic 620 may receive member data records 612a,b . . . n and associated values 712a,b . . . n for identity attributes of the member data record 612. Values 912a,b . . . n for non-identity attributes of member data records 612 may be obtained using logical procedures selected by mapping logic 640 (as discussed above). Thus, a set of member data records 612a comprising values 712 for the identity attributes of the member data record 612a and values 912 for nonidentity attributes may be provided to assembly logic 650 such that assembly logic 650 may assemble result 660 to return to the user in response to query 610.

In one embodiment, query 610 from a user may comprise a reference 910 to a logical procedure 930a . . . d which is to be applied to member data records 612a and their associated attribute values 712, 912 to generate result 660 to be returned in response to query 610. Each of logical procedures 930 may be operable to process one or more member data records 612 either alone or in conjunction with one another according to a defined set of logical steps to select values and attributes to be returned to a user in result 660. For example, a logical procedure 930 may select values for attributes of a member data record to return to a user, a logical procedure 930 may process one or more member records of an entity to select values for attributes of the entity to return to a user, or both (selecting attributes of one or more member data records related as an entity and then further processing the values of the attributes selected for each of the related member data records to select values for attributes of the entity to return to the user). Put another way, a logical procedure may refine the set of, or composite the values of, attributes for one or more member data records to select a final set of values for one or more attributes such that these final values may be returned to the user in result 660. By allowing a user to select a logical procedure 930 for the compositing of the values of attributes of member data records a user may be presented with values or attributes that more closely match a users desires.

Figure 10:
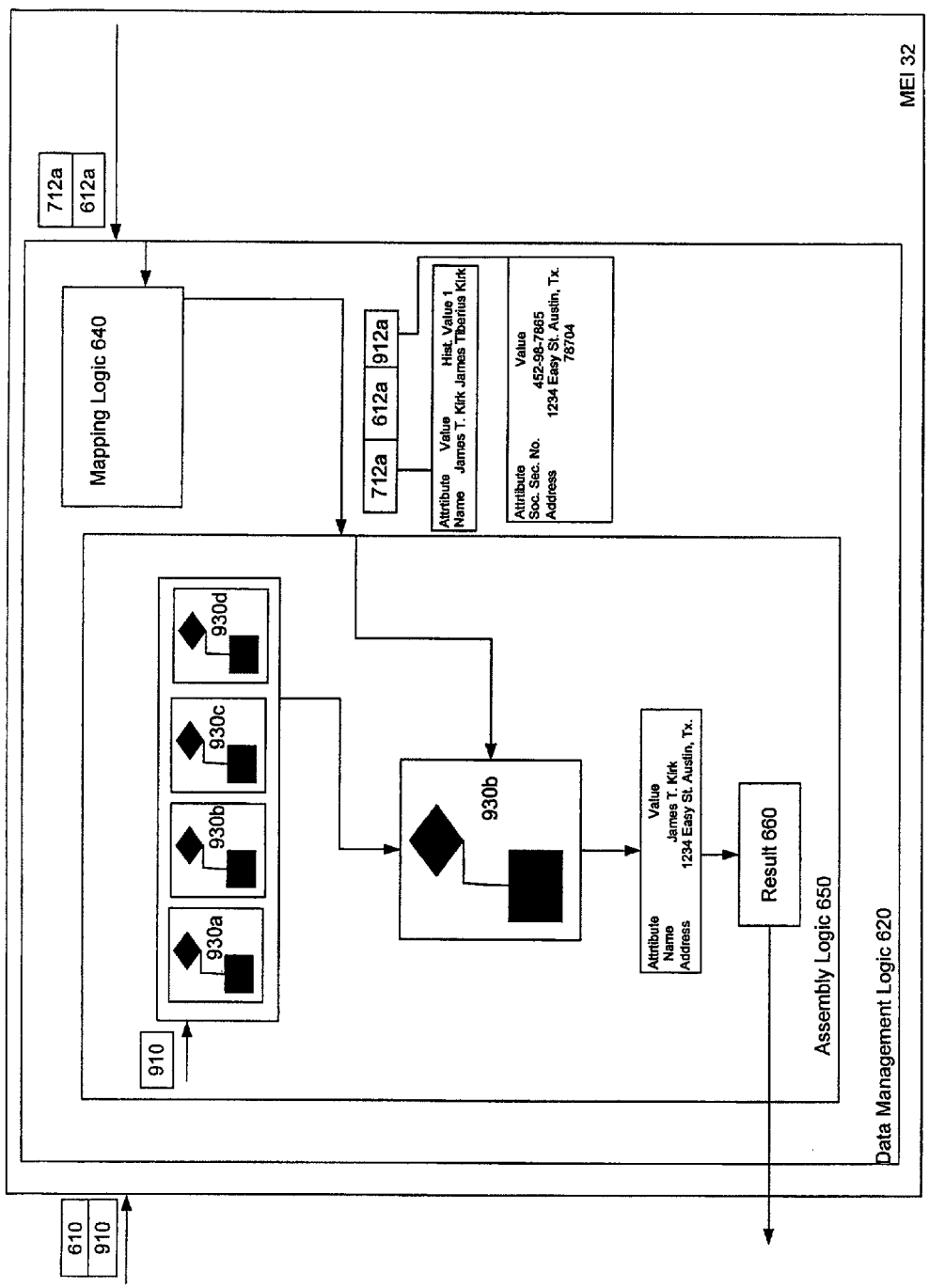
FIG. 10 is a block diagram illustrating an example of one embodiment of data management.
Figure 11:
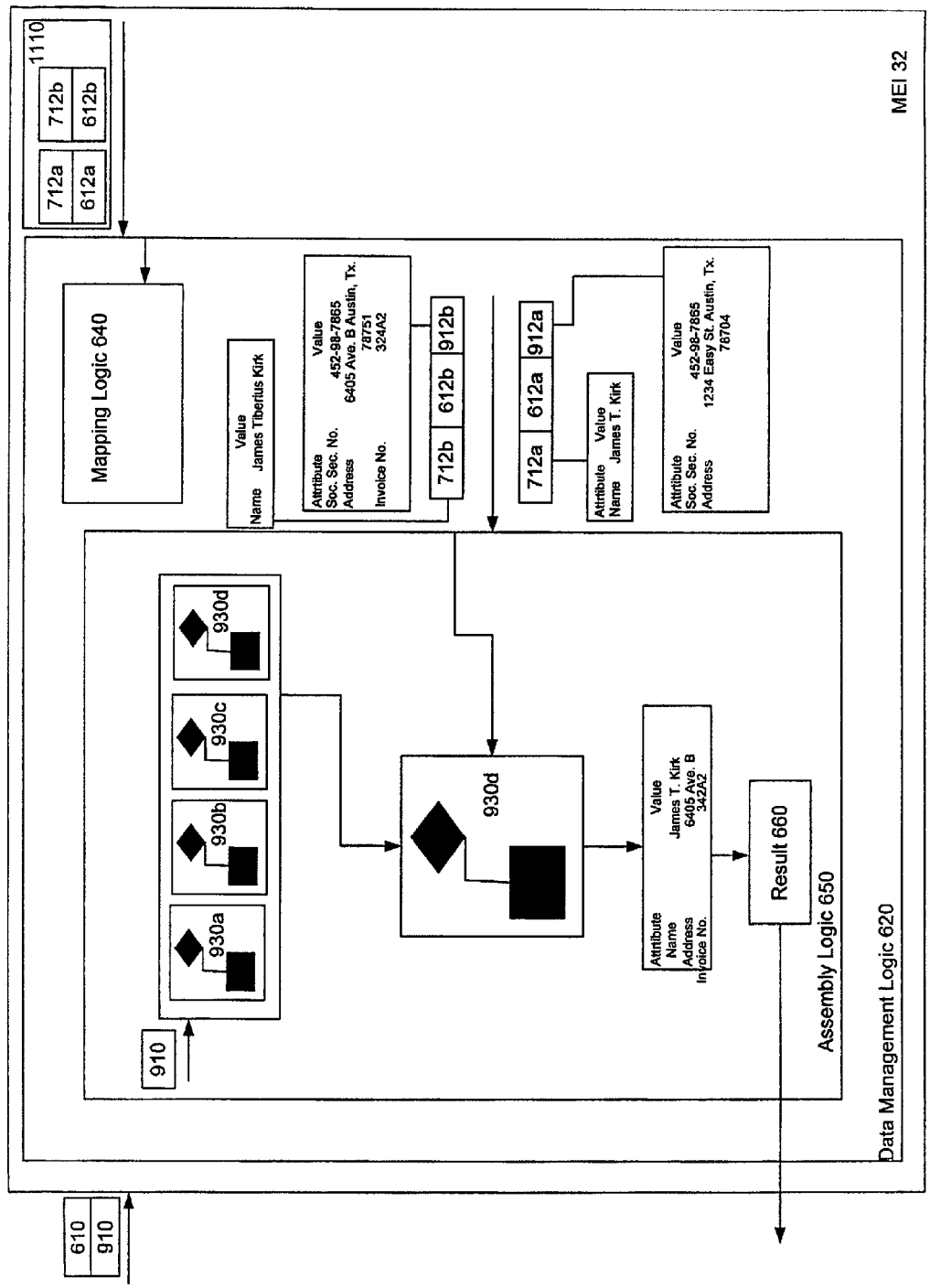
FIG. 11 is a block diagram illustrating an example of one embodiment of data management.

It may be helpful here to illustrate examples of the processing of member data records using a logical procedure. FIGS. 10 and 11 depict examples of this processing. In particular, FIG. 10 depicts one embodiment of the processing of an example member data record to select values for attributes of the member data record while FIG. 11 depicts the processing of example member data records of an entity to composite values for desired attributes corresponding to the entity.

Turning first to FIG. 10, one embodiment of the processing of an example member data record 612a is depicted. Suppose for purposes of this example a user has submitted query 610 to MEI 32 and that member data record 612a has been provided to data management logic 620 such that it can be processed to compose response 660 to the user. Now suppose that member data record 612a is associated with values 712a for the identity attribute of "Name" and that values 712a for the "Name" attribute comprises a current value of "James T. Kirk" and a first historical value of "James Tiberius Kirk". Further suppose that member data record 612a is associated with values 912a for the non-identity attributes of "Social Security No." and "Address" and that value 912a for the "Social Security No." is "452-98-7865" and the value 912a for "Address" is "1234 Easy St., Austin, Tx. 78704".

The user who initiated query 610 may, however, not wish to view values for every attribute of the member data records returned to him, or all the values of an attribute. Consequently, in query 610 a user may select or specify a logical procedure 930a . . . d such that the member data records responsive to query 610 may be processed according to the logical procedure 930 selected to composite or refine the set of attributes or values for those attributes returned to the user such that the user can view desired results to his query.

Continuing with the example above, the user may desire to view only the most recent value for the "Name" attribute and the value for the "Address" attribute. The user may also with to only view the street address, city and state information for the "Address" attribute (e.g. not any zip code information). In order to be presented with his desired results then, in query 610 the user may submit reference 910 to logical procedure 930b. Logical procedure 930b may be operable to select the most recent value for the "Name" attribute of a member data record, and the street address, city and state information for the "Address" attribute. With respect to this example, when member data record 612a is processed using logical procedure 930b referenced in query 910, the value "James T. Kirk" is selected for the "Name" attribute the value "1234 Easy St., Austin, Tx. 78704" is selected for the "Address" attribute and is further processed such that the value for the "Address" attribute becomes "1234 Easy St., Austin, Tx.". The set of values for selected attributes produced by logical procedure 930b (in this case the attributes of "Name" and "Address" and their respective values of "James T. Kirk" and "1234 Easy St., Austin, Tx.") may then be used in assembling result 660 to send to the user in response to query 610.

Proceeding to FIG. 11 one embodiment of the processing of example member data records 612a and 612b which comprise an entity 1110 is depicted. Suppose for purposes of this example a user has submitted query 610 to MEI 32 and that member data records 612a and 612b which are linked (as described above) as an entity 1110 have been provided to data management logic 620 such that member data records 612a and 612b can processed to compose response 660 to the user regarding entity 1110. Now suppose that member data record 612a is from information source 34 and is associated with values 712a for the identity attribute of "Name" and that values 712a for the "Name" identity attribute further comprises a value of "James T. Kirk". Further assume that member data record 612a is associated with values 912a for the non-identity attributes of "Social Security No." and "Address" and that the value 912a for the "Social Security No." is "452-98-7865" and the value 912a for "Address" is "1234 Easy St., Austin, Tx. 78704". Additionally suppose that member data record 612b is from information source 36 and is associated with values 712b for the identity attribute of "Name" and that values 712b for the "Name" identity attribute further comprises a value of "James Tiberius Kirk". Further suppose that member data record 612b is associated with values 912b for the non-identity attributes of "Social Security No.", "Invoice No." and "Address" and that value 912b for the "Social Security No." is "452-98-7865", the value 912b for "Invoice No." is "324A2" and the value for "Address" is "6405 Ave. B, Austin, Tx. 78751".

The user who initiated query 610 may, however, not wish to view values for every attribute of an entity (e.g. multiple linked member data records) returned to him, or all the values of an attribute. Consequently, in query 610 a user may select or specify a logical procedure 930a . . . d such that the member data records responsive to query 610 may be processed according to the logical procedure 930 selected to composite or refine the set of attributes or values for those attributes returned to the user and the user can view the desired results to his query.

Continuing with the example above, in order to be presented with his desired results then, in query 610 the user may submit reference 910 to logical procedure 930d. Logical procedure 930d may be operable to select the value for the "Name" attribute associated with a member data record from information source 34 if it exists, the value for the "Address" attribute associated with a member data record from information source 36 if it exists, the value for an "Invoice No." attribute. Logical procedure 930d may be further operable to process the selected value for the "Address" attribute to obtain the street information from the "Address" attribute. With respect to this example, when member data records 612a and 612b are processed using logical procedure 930d referenced in query 610, the value "James T. Kirk" is selected for the "Name" attribute the value "6405 Ave. B Austin, Tx 78751" is selected for the "Address" attribute and is further processed such that the value for the "Address" attribute becomes "6405 Ave. B", and the value "324A2" is selected for the "Invoice No." attribute. The set of values for selected attributes produced by logical procedure 930d (in this case the attributes of "Name", "Invoice No." and "Address" and their respective values of "James T. Kirk", "324A2" and "6405 Ave. B") may then be used in assembling result 660 to send to the user in response to query 610.

Again, after reviewing the above descriptions and examples it will be realized that these logical procedures may refine and composite or otherwise process the value of attributes of one or more member data records according to almost any logic desired. The definition of these various logical procedures may also occur in almost any manner desired. In one embodiment, for example, a user may utilize a graphical interface to define each of the logical procedures where the graphical interface may offer a set of visual representations of functionality which the user may assemble to define a desired logical procedure and a logical procedure instantiated from the graphical representation created by the user. These logical procedures may also be hard coded during installation or configuration of MEI such that a user may select from a set of pre-define logical procedures, the logical procedures may be provided by one or more third party vendors, etc.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method implemented on a computing device including a processor, comprising:

obtaining one or more member data records in response to a query, wherein each member data record includes a set of identity attributes and a set of non-identity attributes, values for the set of identity attributes of the member data record are stored locally relative to the member data record and values for the set of non-identity attributes of the member data record are stored in one or more information sources that include at least one different manner of access than local storage and are disposed at corresponding locations remote from the member data record;

determining a first logical procedure from among a set of logical procedures for each of the non-identity attributes, wherein each logical procedure is configured to communicate with a corresponding information source and retrieve a value for corresponding non-identity attribute from that information source in accordance with a corresponding manner of access; and obtaining a value for each of the non-identity attributes of the one or more member data records, wherein obtaining the value comprises invoking the determined first logical procedure corresponding to each non-identity attribute to obtain the value for that non-identity attribute from the information source at the corresponding remote location.

2. The method of claim 1, wherein the first logical procedure is invoked with the values for at least one of the locally stored identity attributes of a corresponding member data record.

3. The method of claim 2, wherein the first logical procedure is determined based on the remote location.

4. The method of claim 1, further comprising:
mapping the non-identity attributes to the set of logical procedures; and
determining the first logical procedure for each of the non-identity attributes based on the mappings.

5. The method of claim 1, further comprising receiving a query comprising one or more criteria, wherein the member data records are determined utilizing the one or more criteria.

6. The method of claim 5, wherein obtaining the one or more member data records comprises:
identifying a set of candidate member data records; and
scoring each of the set of candidate data records, wherein the score of each of the set of candidate data records is based on a likelihood of a match between the candidate data record and the set of criteria.

7. A method implemented on a computing device including a processor, comprising:
obtaining one or more member data records in response to a query, wherein each member data record is associated with a set of attributes;
obtaining a value for each of the set of attributes for the one or more member data records, from one or more information sources that include at least one manner of access different than a manner of accessing the member data records and are disposed at corresponding locations remote from the manner data records, wherein obtaining the value comprises invoking a first logical procedure corresponding to the attribute to obtain the value from a corresponding remote location in accordance with a corresponding manner of access; and
determining a set of final attributes and corresponding final values from said set of attributes and obtained values utilizing a second logical procedure, wherein at least one of said attributes determined as said final attribute is associated with a plurality of different ones of said obtained values and said second logical procedure determines said corresponding final value for that determined final attribute from said plurality of associated obtained values.

8. The method of claim 7, further comprising selecting the second logical procedure from a set of logical procedures each of the set of logical procedures operable to apply rules to the one or more member data records.

9. The method of claim 8, further comprising receiving a query, wherein the second logical procedure is selected based on the query.

10. The method of claim 8, wherein the second logical procedure is operable to select the final attributes from the set of attributes.

11. The method of claim 10, wherein the second logical procedure is operable to select between a first value for a first final attribute corresponding to a first member data record and a second value for the first final attribute corresponding to the first member data record.

12. The method of claim 10, wherein the second logical procedure is operable to select between a first value for a first final attribute corresponding to a first member data record and a second value for the first final attribute corresponding to a second member data record.

13. A system, comprising:
a master entity index system comprising a processor a local data store, the local data store comprising one or more member data records wherein each member data record includes a set of identity attributes and a set of non-identity attributes and values for the set of identity attributes of the member data record are stored at the local data store; and
a set of remote information sources wherein values for the set of non-identity attributes of each member data record are stored at one or more corresponding remote information sources that include at least one different manner of access than the local data store and wherein the master entity index system is operable to provide a set of member data records in response to a query, and for each of the set of member data records:
determine a first logical procedure from among a set of logical procedures for each of the non-identity attributes, wherein each logical procedure is configured to communicate with a corresponding remote information source and retrieve a value for a corresponding non-identity attribute from that remote information source in accordance with a corresponding manner of access, and obtain a value for each of the non-identity attributes of the one or more member data records, wherein obtaining the value comprises invoking the determined first logical procedure corresponding to each non-identity attribute to obtain the value for that non-identity attribute from the corresponding remote information source.

14. The system of claim 13, wherein the first logical procedure is invoked with the values for at least one of the identity attributes of a corresponding member data record.

15. The system of claim 14, wherein the first logical procedure is determined based on the remote information source corresponding to the member data record.

16. The system of claim 13, wherein the master entity index system is further operable to:
map the non-identity attributes to the set of logical procedures; and
determine the first logical procedure for each of the non-identity attributes based on the mappings.

17. The system of claim 13, wherein the master entity index system is operable to receive a query comprising one or more criteria and determine the set of member data records utilizing the one or more criteria.

18. The system of claim 17, wherein the master entity index system is operable to obtain the one or more member data records by:
identifying a set of candidate member data records; and
scoring each of the set of candidate data records, wherein the score of each of the set of candidate data records is based on a likelihood of a match between the candidate data record and the set of criteria.

19. A system, comprising:
a master entity index system comprising a processor and a local data store, the local data store comprising one or more member data records wherein each member data record is associated with a set of attributes corresponding to the member data record and wherein the master entity index system is operable to determine a response to a query wherein determining the response comprises obtaining a set of member data records and values for the set of attributes corresponding to each of the set of member data records from one or more information sources that include at least one manner of access different than a manner of accessing the member data records and are disposed at corresponding locations remote from the member data records by invoking a first logical procedure corresponding to the attribute to obtain the value from a corresponding remote location in accordance with a corresponding manner of access and determining a set of final attributes and corresponding final values from the values of the set of attributes of each of the member data records utilizing a second logical procedure, wherein at least one of said attributes determined as said final attribute is associated with a plurality of different ones of said obtained values and said second logical procedure determines said corresponding final value for that determined final attribute from said plurality of associated obtained values.

20. The system of claim 19, wherein the master entity index system is operable to select the second logical procedure from a set of logical procedures, each of the set of logical procedures operable to apply rules to the one or more member data records.

21. The system of claim 20, wherein the second logical procedure is selected based on the query.

22. The system of claim 20, wherein the second logical procedure is operable to select the final attributes from the set of attributes.

23. The system of claim 22, wherein the second logical procedure is operable to select between a first value for a first final attribute corresponding to a first member data record and a second value for the first final attribute corresponding to the first member data record.

24. The system of claim 22, wherein the second logical procedure is operable to select between a first value for a first final attribute corresponding to a first member data record and a second value for the first final attribute corresponding to a second member data record.

25. A computer program product comprising:
a computer readable storage device having computer readable program code embodied therewith, the computer readable program code comprising computer readable program code configured to:
obtain one or more member data records in response to a query, wherein each member data record includes a set of identity attributes and a set of non-identity attributes, values for the set of identity attributes of the member data record are stored locally relative to the member data record and values for the set of non-identity attributes of the member data record are stored in one or more information sources that include at least one different manner of access than local storage and are disposed at corresponding locations remote from the member data record;
determine a first logical procedure from among a set of logical procedures for each of the non-identity attributes, wherein each logical procedure is configured to communicate with a corresponding information source and retrieve a value for a corresponding non-identity attribute from that information source in accordance with a corresponding manner of access; and
obtain a value for each of the non-identity attributes of the one or more member data records, wherein obtaining the value comprises invoking the determined first logical procedure corresponding to each non-identity attribute to obtain the value for that non-identity attribute from the information source at the corresponding remote location.

26. The computer program product of claim 25, wherein the first logical procedure is invoked with the values for at least one of the locally stored identity attributes of a corresponding member data record.

27. The computer program product of claim 26, wherein the first logical procedure is determined based on the remote location.

28. The computer program product of claim 25, wherein the computer readable program code further comprises computer readable program code configured to:
map the non-identity attributes to the set of logical procedures; and
determine the first logical procedure for each of the non-identity attributes based on the mappings.

29. The computer program product of claim 25, wherein the computer readable program code further comprises computer readable program code configured to:
receive a query comprising one or more criteria, wherein the member data records are determined utilizing the one or more criteria.

30. The computer program product of claim 29, wherein obtaining the one or more member data records comprises:
identifying a set of candidate member data records; and
scoring each of the set of candidate data records, wherein the score of each of the set of candidate data records is based on a likelihood of a match between the candidate data record and the set of criteria.

31. A computer program product comprising:
a computer readable storage device having computer readable program code embodied therewith, the computer readable program code comprising computer readable program code configured to:
obtain one or more member data records in response to a query, wherein each member data record is associated with a set of attributes;
obtain a value for each of the set of attributes for the one or more member data records from one or more information sources that include at least one manner of access different than a manner of accessing the member data records and are disposed at corresponding locations remote from the member data records, wherein obtaining the value comprises invoking a first logical procedure corresponding to the attribute to obtain the value from a corresponding remote location in accordance with a corresponding manner of access; and
determine a set of final attributes and corresponding final values from said set of attributes and obtained values utilizing a second logical procedure, wherein at least one of said attributes determined as said final attribute is associated with a plurality of different ones of said obtained values and said second logical procedure determines said corresponding final value for that determined final attribute from said plurality of associated obtained values.

32. The computer program product of claim 31, wherein the computer readable program code further comprises computer readable program code configured to:
select the second logical procedure from a set of logical procedures each of the set of logical procedures operable to apply rules to the one or more member data records.

33. The computer program product of claim 32, wherein the computer readable program code further comprises computer readable program code configured to:
receive a query, wherein the second logical procedure is selected based on the query.

34. The computer program product of claim 32, wherein the second logical procedure is operable to select the final attributes from the set of attributes.

35. The computer program product of claim 34, wherein the second logical procedure is operable to select between a first value for a first final attribute corresponding to a first member data record and a second value for the first final attribute corresponding to the first member data record.

36. The computer program product of claim 34, wherein the second logical procedure is operable to select between a first value for a first final attribute corresponding to a first member data record and a second value for the first final attribute corresponding to a second member data record.

* * * * *